(12) United States Patent
Pangal et al.

(10) Patent No.: US 8,452,932 B2
(45) Date of Patent: May 28, 2013

(54) SYSTEM AND METHOD FOR EFFICIENTLY CREATING OFF-SITE DATA VOLUME BACK-UPS

(75) Inventors: Gururaj Pangal, Pleasanton, CA (US); Urshit Parikh, Sunnyvale, CA (US); Richard Testardi, Boulder, CO (US); Maurilio Cometto, Palo Alto, CA (US); Kuriakose George Kulangara, Bangalore (IN)

(73) Assignee: StorSimple, Inc., Santa Clara, CA (US)

( * ) Notice: Subject to any disclaimer, the term of this patent is extended or adjusted under 35 U.S.C. 154(b) by 408 days.

(21) Appl. No.: 12/798,321

(22) Filed: Apr. 1, 2010

(65) Prior Publication Data
US 2011/0167221 A1    Jul. 7, 2011

Related U.S. Application Data

(60) Provisional application No. 61/335,653, filed on Jan. 6, 2010.

(51) Int. Cl.
*G06F 13/00*    (2006.01)

(52) U.S. Cl.
USPC .................................. 711/162; 711/E12.103

(58) Field of Classification Search
None
See application file for complete search history.

(56) References Cited

U.S. PATENT DOCUMENTS

2010/0306174 A1* 12/2010 Otani ........................... 707/640

* cited by examiner

*Primary Examiner* — Edward Dudek, Jr.
*Assistant Examiner* — Sean D Rossiter
(74) *Attorney, Agent, or Firm* — Dag Johansen, Esq.

(57) ABSTRACT

Data back-ups are a critical task of any information technology department. Data back-ups are typically performed using some type of back-up tape systems. Internet based data storage systems now offer data storage services at low prices. To take advantage of such services, a system and method for efficiently back-up data volumes is disclosed. The data back-up system divides data volumes into fingerprinted data slices. Redundant data slices are then removed. Unique fingerprinted data slices are then copied to an internet based storage provider.

19 Claims, 18 Drawing Sheets

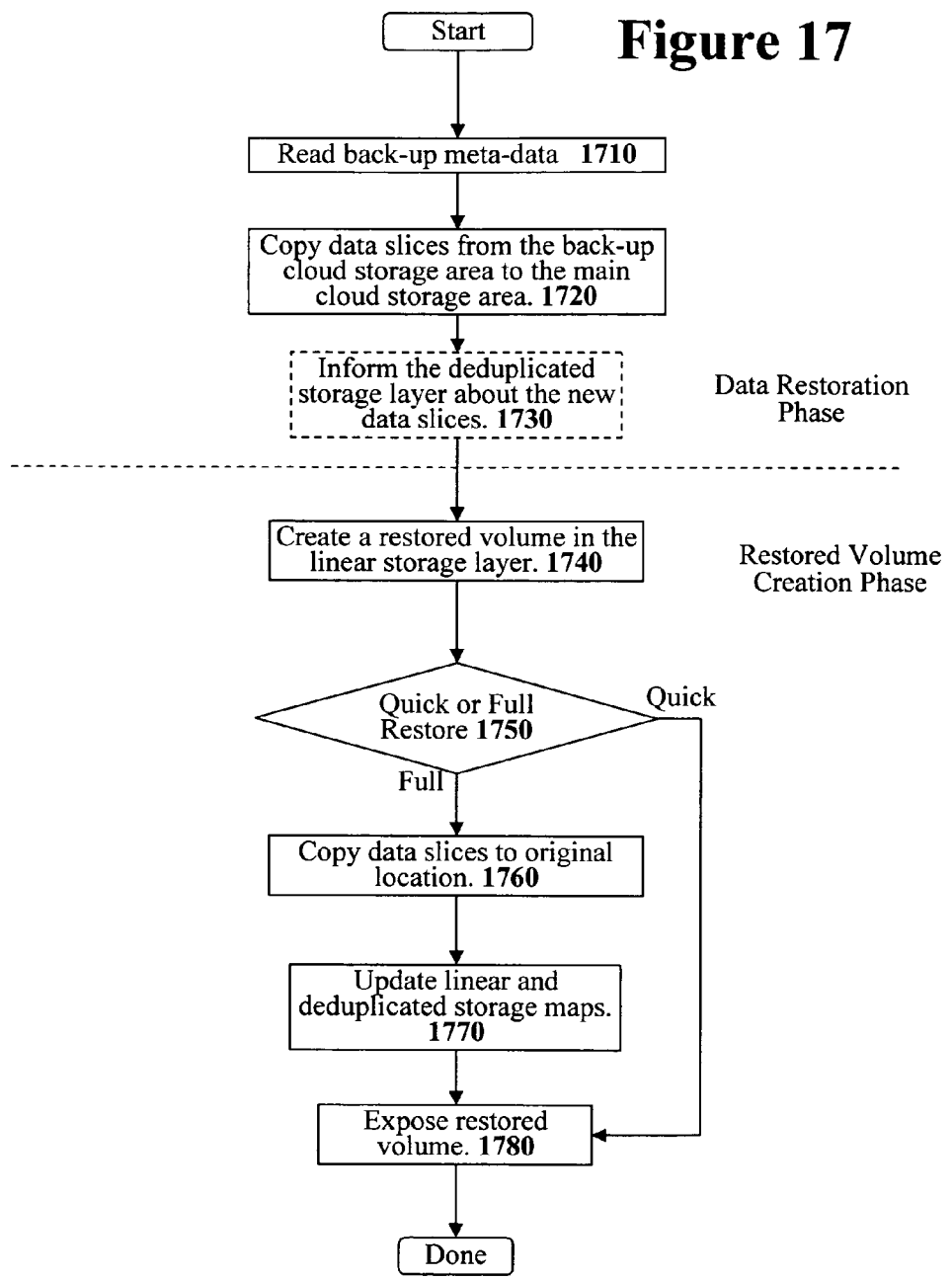

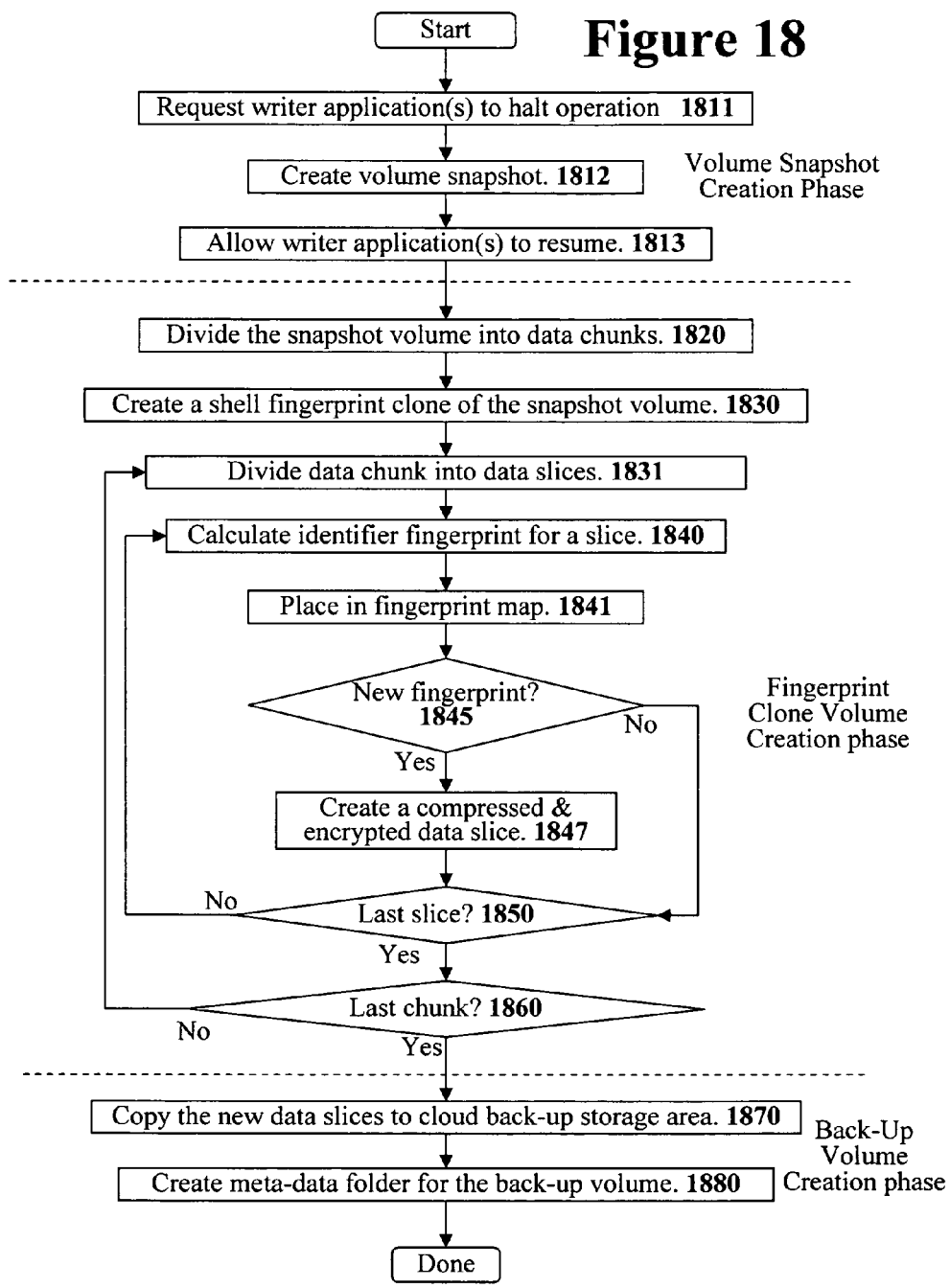

SYSTEM AND METHOD FOR EFFICIENTLY CREATING OFF-SITE DATA VOLUME BACK-UPS

RELATED APPLICATIONS

The present patent application claims the benefit of the previous U.S. Provisional Patent Application entitled "SYSTEM AND METHOD FOR STORING DATA OFF SITE" filed on Jan. 6, 2010 having Ser. No. 61/335,653.

TECHNICAL FIELD

The present invention relates to the field of digital computer systems. In particular, but not by way of limitation, the present disclosure teaches techniques for quickly and efficiently creating data volume back-ups.

BACKGROUND

Computer systems have become an indispensable tool used in modern life. Nearly every business and government agency is now dependent upon computer systems for digital communication, project planning, document creation, information storage, transaction processing, project management, inventory management, financial operations, and a large number of other mission critical services.

Although individual pieces of computer hardware and computer software can easily be replaced by an entity using computer systems by purchasing new computer equipment or computer software, the entity's accumulated stores of data cannot easily be replaced. Thus, data storage and data protection is one of the most critical parts of any modern information technology infrastructure.

Recently, online data storage providers have become available that offer reliable off-site data storage services. Since the internet is often referred to as "the cloud" and these data storage services accept data to be stored through the internet and make the stored data available for retrieval across the internet, these data storage services are commonly referred to as cloud storage providers. Data storage clouds provide data storage in an "on-demand" basis at very low costs such that data center that uses a cloud storage provider does not need to worry about storage capacity planning, data storage provisioning, data center space, power, cooling, off-site data backup, replacing failed drives, back-up tape management, and other factors that must be addressed when creating a reliable data back-up system.

Although these cloud storage providers offer an attractive service, it is currently difficult for most information technology departments to easily use these cloud storage services. The interfaces of the cloud storage providers are generally not directly compatible with most commonly used applications or back-up systems. Thus, it is not easy for most information technology departments to use cloud storage providers as a back-up service even when those information technology departments desire to do so.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 17 illustrates a flow diagram that describes how a cloud storage array may restore a data volume from a back-up a data volume stored at cloud storage provider.

FIG. 18 illustrates a flow diagram that describes how a traditional storage system may use the teachings of the present disclosure to back-up data volumes at a cloud storage provider.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although some of the example embodiments are disclosed with reference to a specific data storage system that already uses cloud storage services for primary data storage, other data storage systems may be adapted to used the teachings in this document. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
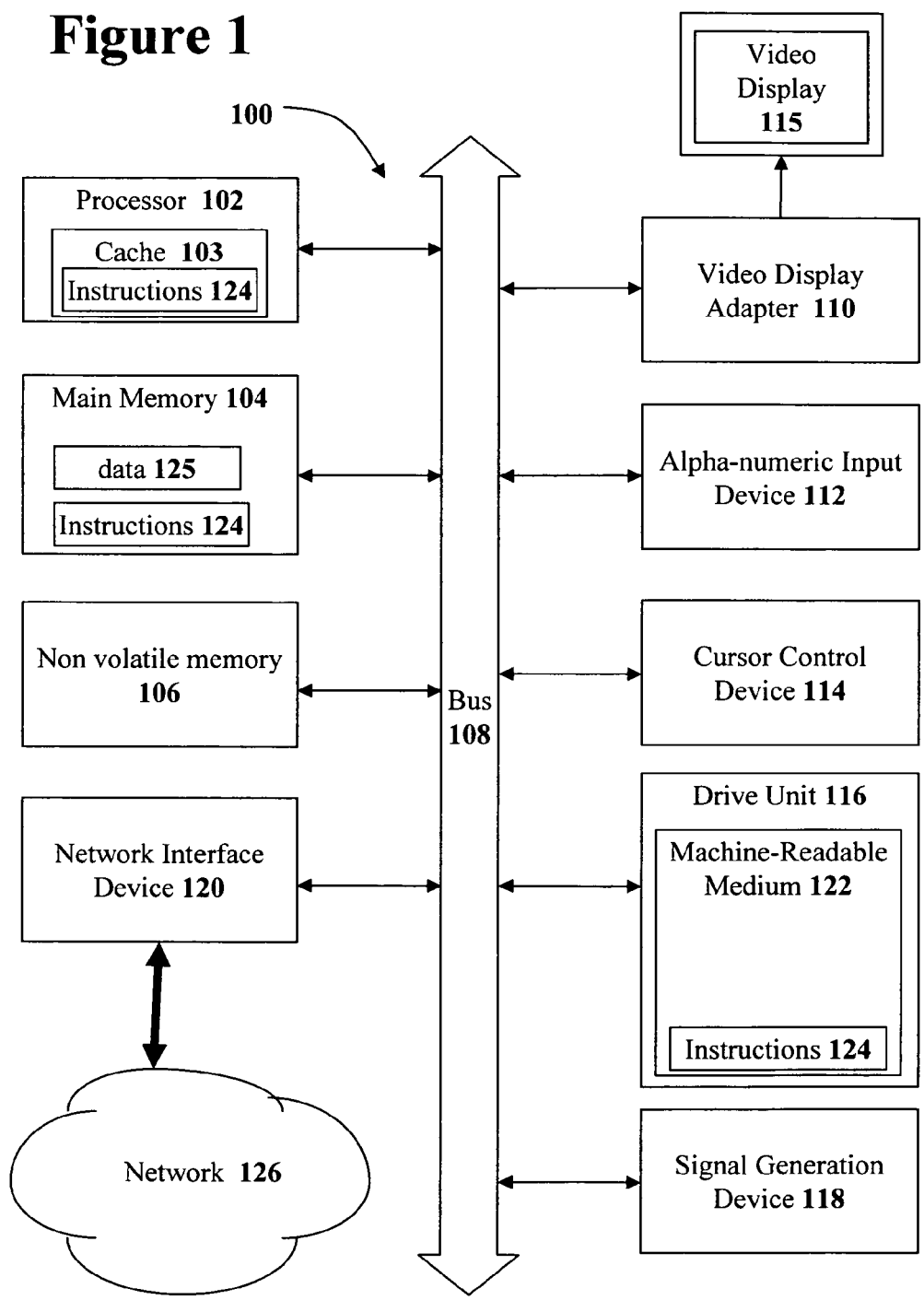
FIG. 1 illustrates a diagrammatic representation of machine in the example form of a computer system within which a set of instructions, for causing the machine to perform any one or more of the methodologies discussed herein, may be executed.

The present disclosure concerns digital computer systems. FIG. 1 illustrates a diagrammatic representation of a machine in the example form of a computer system 100 that may be used to implement portions of the present disclosure. Within computer system 100 of FIG. 1, there are a set of instructions 124 that may be executed for causing the machine to perform any one or more of the methodologies discussed within this document.

In a networked deployment, the machine of FIG. 1 may operate in the capacity of a server machine or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network server, a network router, a network switch, a network bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 of FIG. 1 includes a processor 102 (e.g., a central processing unit (CPU), a graphics processing unit (GPU) or both) and a main memory 104 and a non volatile memory 106, which communicate with each other via a bus 108. The non volatile memory 106 may comprise flash memory and may be used either as computer system memory, as a file storage unit, or both. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120. Note that not all of these parts illustrated in FIG. 1 will be present in all embodiments. For example, a computer server system may not have a video display adapter 110 or video display system 115 if that server is controlled through the network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within a cache memory 103 associated with the processor 102. The main memory 104 and the cache memory 103 associated with the processor 102 also constitute machine-readable media.

The instructions 124 may further be transmitted or received over a computer network 126 via the network interface device 120. Such transmissions may occur utilizing any one of a number of well-known transfer protocols such as the well known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, battery-backed RAM, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Storage Area Networks

To make enterprise data centers more efficient, the concept of a storage area network (SAN) was introduced. A storage area network allows computer applications to access remote computer storage devices (such as hard disk arrays, magnetic tape libraries, and optical disc storage devices) in a manner wherein the remote storage devices appear the same as storage devices attached to the local computer system. The use of a storage area network (SAN) allows multiple applications and servers to share storage systems. The use of shared storage simplifies storage administration since fewer storage systems need to be maintained.

Storage area networks simplify the task of creating disaster recovery systems for computer systems. When unforeseen damage (due to man-made or natural disaster) renders a particular storage system inoperable, a mission critical computer system must be able to quickly resume operation. With a storage area network (SAN), an independent secondary storage system located at a distant location can be used to replicate the data being stored on a primary storage system at a primary location. Thus, if a disaster damages the primary storage system at the primary location, the secondary storage system can be brought online to continue operations.

A storage area network generally operates as an integrated part of the operating system. Specifically, the operating system provides the basic file system that is responsible for creating files, writing to files, reading from files, duplicating files, deleting files, and other various file system operations. The storage area network (SAN) operates below the file system and only provides raw logical volume and logical block address level operations.

Figure 2:
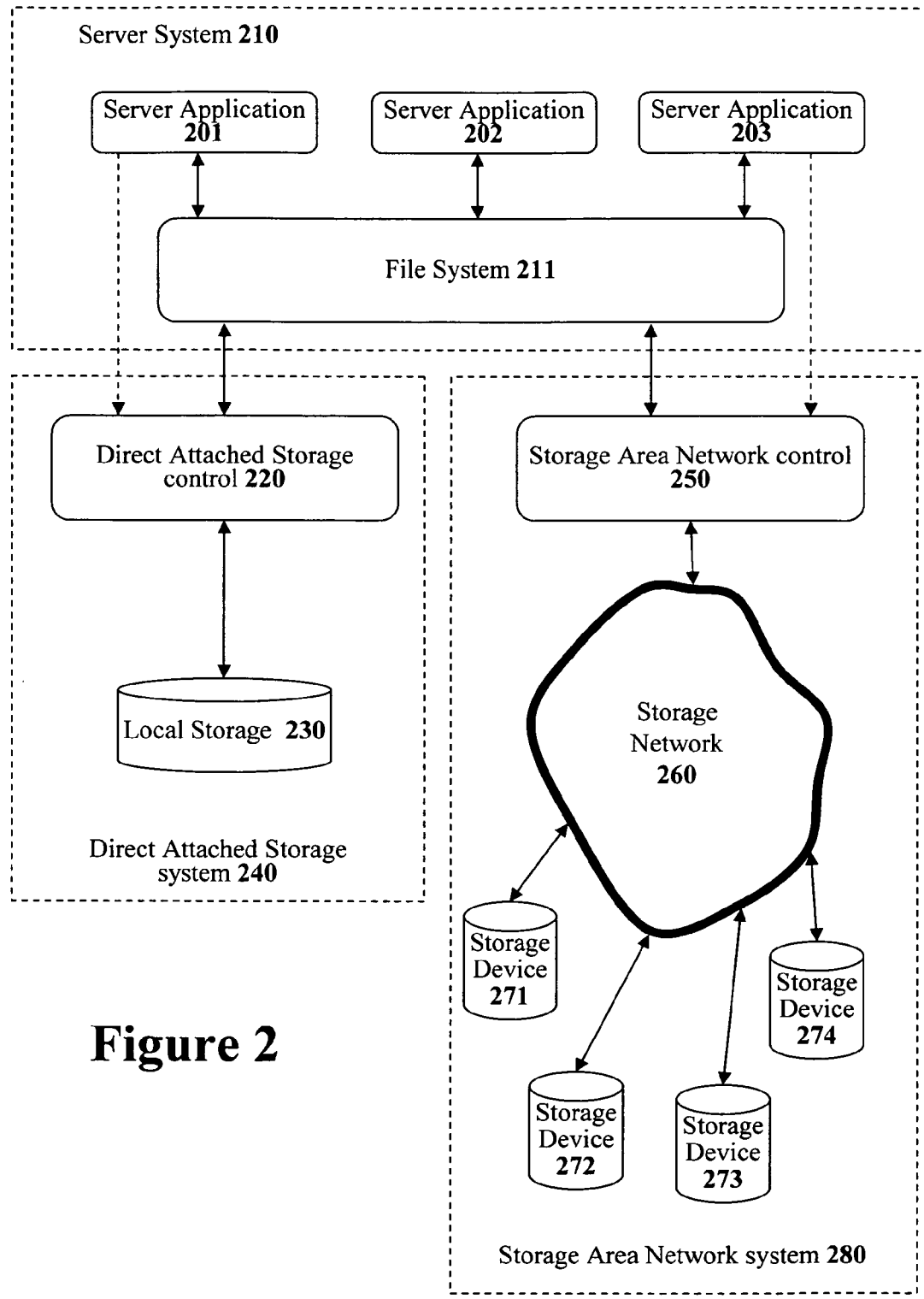
FIG. 2 illustrates a block diagram illustrating the difference between a traditional direct access storage system and a storage area network (SAN).

The difference between a traditional direct access storage system and a storage area network (SAN) is illustrated in FIG. 2. Referring to FIG. 2, several server applications (201, 202, and 203) are running on a server system 210. The several server applications (201, 202, and 203) will generally write and read data files using a file system 211 that is part of the operating system running on the server system 210. However, applications may also bypass the file system 211 to read and write raw data blocks directly to storage. In a typical computer system with a direct attached storage system 240, the file system 211 accesses a direct attached storage controller 220 to access a local storage system 230. To use a storage area network system 280, the direct attached storage controller 220 is replaced with a storage area network controller 250. Instead of accessing a local storage device, the storage area network controller 250 issues storage requests on a storage area network 260. The appropriate storage device (271, 272, 273, or 274) will respond to the storage request. Applications that bypassed the file system 211 to directly use the direct attached storage system 240 may similarly by pass the file system 211 to directly access the storage area network controller 250.

With a storage area network system 280, additional storage devices can be added as necessary. By decoupling server systems from their storage components, if a particular server system malfunctions then that malfunctioning server system can be quickly replaced with a new server system that can immediately access the data for that server which is available on the storage area network.

The use of storage area networks concentrates the data storage tasks for an information technology department. And since the data storage becomes more concentrated, the data becomes more vulnerable to disasters. For example, the destruction of a single large data storage device (or data storage center) that provides data storage services to multiple applications can bring down an entire business since such a large amount of data (documents, financial data, email, etc.) is stored in that single data storage device. Thus, when using storage area networks (and any other technology that concentrates data storage) the use of reliable data back-up systems becomes critical.

The creation of data back-ups is not glamorous task but it is utterly critical since the loss of data can bring a business to a stand still. Data back-up systems can be very expensive and difficult to use. A long set of procedures must be followed consistently and accurately in order to regularly create back-ups. The steps required may include taking a snapshot of a data storage device, creating an initial back-up, removing duplicates to reduce storage requirements, creating incremental back-ups, maintaining a virtual tape library, creating real back-up tapes, and moving back-up tapes to off-site storage. In small and medium sized businesses with small information technology departments, the task of performing these back-ups can take up a significant amount of their time and budget.

Using Cloud Storage Back-Ups

To simplify the task of storing data off-site, several internet-based data storage services have been introduced. Since these services store data across the internet which is commonly drawn in diagrams as a cloud, these data storage services are commonly referred to as "cloud storage services". Cloud storage services offer customers reliable off-site data storage at inexpensive prices. By using a cloud storage service, an information technology department can outsource the tasks of purchasing and maintaining a back-up storage system. Furthermore, the task of ensuring that back-up tapes and transported and stored at an off-site location is eliminated since the data is backed-up across the internet to a remote location.

Figure 3:
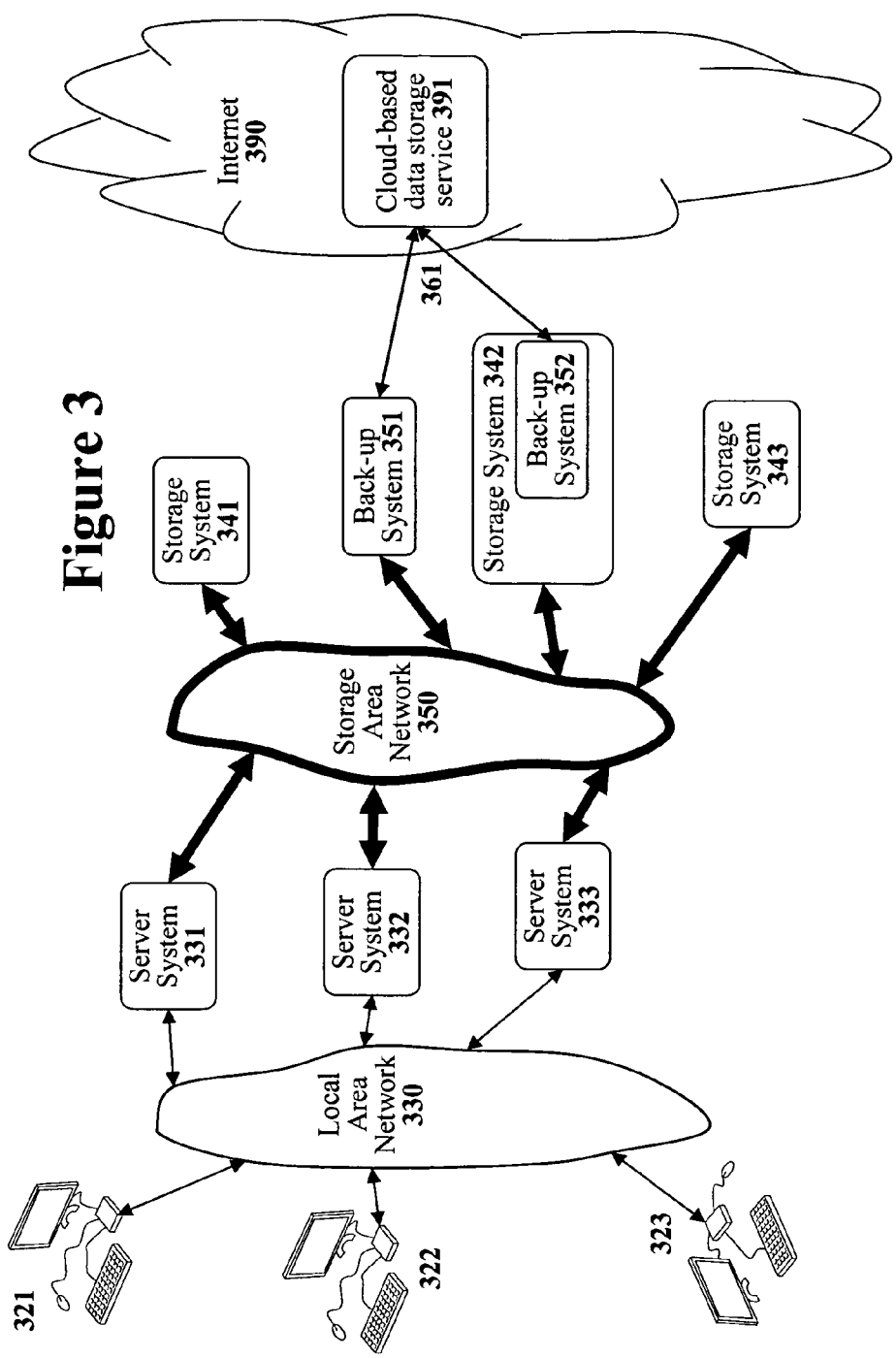
FIG. 3 illustrates how a cloud storage service may be used to provide data back-up services to a business that uses computer systems.

FIG. 3 illustrates how a cloud storage service 391 may be used to provide data back-up services to a business that uses computer systems. In FIG. 3, a set of individual computer workstations (321, 322, and 323) operate on a local area network 330. Those individual computer workstations (321, 322, and 323) share a set of computer servers (331, 332, and 333) that provide shared services to the computer workstations (321, 322, and 323) such as email service, file server services, database services, etc. In the particular office arrangement of FIG. 3, the office uses a storage area network 350 with storage systems (341, 342, and 343) to provide storage services to all of the computer servers (331, 332, and 333). To back-up the storage systems (341, 342, and 343), the office may use cloud-based data storage service 391 available on the internet 390. (Note that the use of a storage area network 350 is just one particular implementation and not necessary in order to use a cloud storage service for data back-up operations.)

Various different methods may be used to provide cloud storage based back-up services. A stand-alone back-up system 351 may be used to provide the cloud storage based back-up services. Alternatively, the individual storage systems may have their own back-up systems such as back-up system 352 integrated within storage system 342. The back-up systems copy the information stored in the storage systems (341, 342, and 343) across a communication link 361 to the cloud-based data storage service 391 available on the internet 390.

If a small entity were easily able to outsource the creation of off-site back-ups to a cloud computing provider that offers data storage services, then that small entity would be relieved of a very difficult information technology task. However, at the present time it is not easy to use cloud storage services for back-up operations. Specifically, there are several compatibility, security, and performance issues that prevent most small entities from using such cloud computing storage systems. For example, office computer system maintain a large amount of confidential information (such as trade secrets, financial information, personnel records, etc.) such that an office must obtain acceptable security guarantees before using a cloud data storage provider for off-site back-ups.

The technical issues of using a cloud storage provider for off-site back-up services are also not simple. The interfaces provided by cloud storage providers are very different than the interfaces used by most data back-up systems. Furthermore, the internet data communication line 361 between a back-up system (351 or 352) and the cloud storage provider 391 generally does not have a large amount of bandwidth such that it would take a very long time to perform a full back-up.

Thus, using a cloud storage provider for off-site back-up services has not become very commonplace yet.

To simplify the use of cloud storage services for back-up operations, this document introduces cloud storage based data back-up systems designed to efficiently integrate with existing office computer systems. The disclosed cloud storage based data back-up systems solve several of the technical challenges associated with using cloud storage services. Two different implementations are disclosed: a cloud-based back-up system for use with a data tiered based storage system that may already use cloud storage and a cloud-based back-up system for use with more traditional storage systems. The back-up system for use with a storage system that already uses cloud based storage will be described first.

Cloud Storage Array Overview

Figure 4:
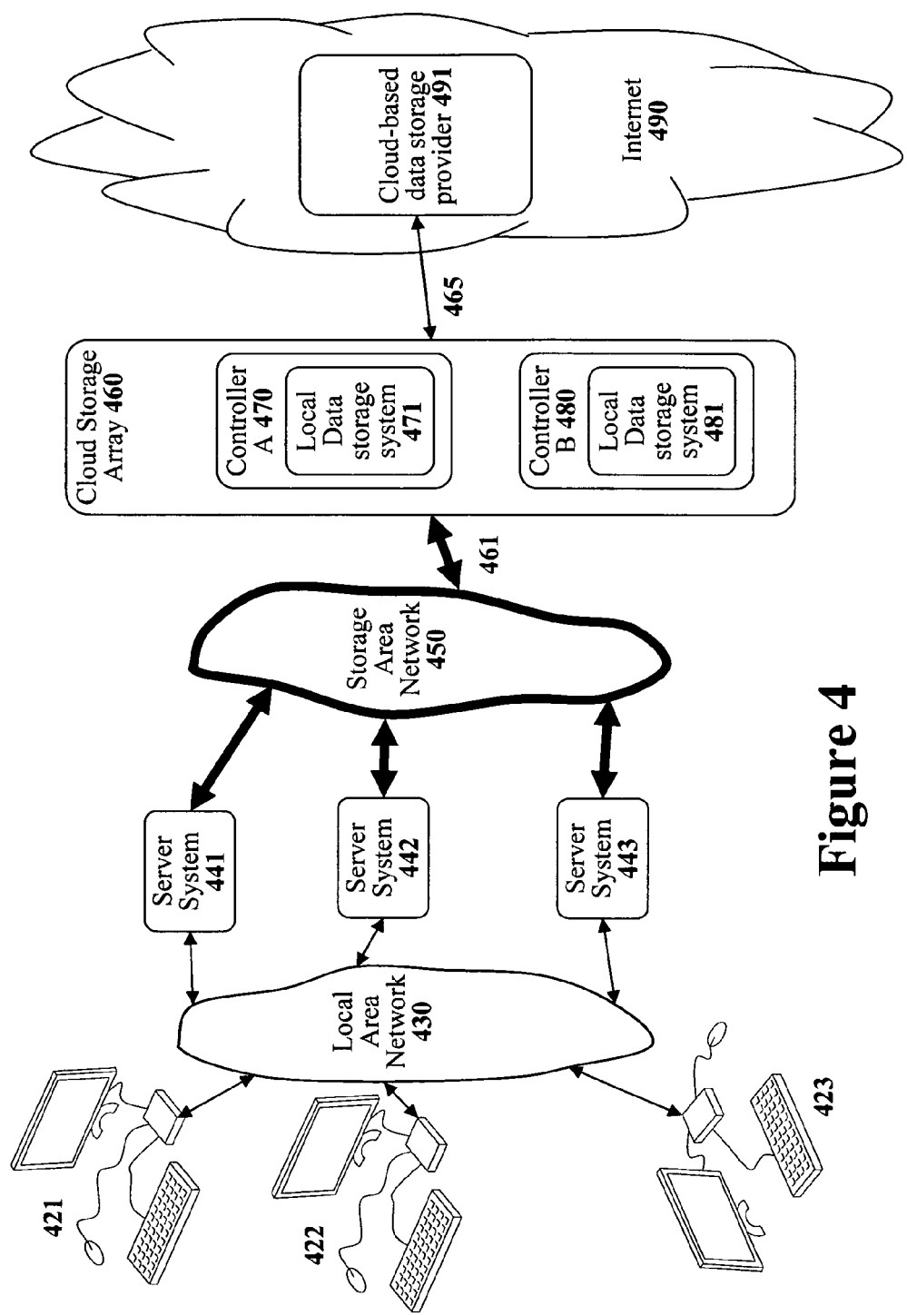
FIG. 4 illustrates a cloud storage array system used within a typical office computer network system.

In addition to providing data back-up services, a cloud storage service may also be used to provide primary data storage services if a storage system is constructed in a manner that handles the issues of using a cloud based storage system. FIG. 4 illustrates a hybrid storage system 400 that combines advantages and flexibility of a local storage area network 450 with the reliability and infinite capacity of an outsourced cloud based data storage system 491. The hybrid storage system 400 is referred to as a "cloud storage array".

FIG. 4 is a conceptual diagram that illustrates how a cloud storage array 460 can be used to provide reliable data storage services to a typical local area network based computer environment that may be used by a business, school, or any other organization. Referring to FIG. 4, a typical local area network has multiple user workstations (421, 422, and 423) coupled to a local area network 430. In addition to the user workstations (421, 422, and 423), a typical office network also has multiple server systems (441, 442, and 443) that provide various services to the users at the user workstations (421, 422, and 423). Typical server systems include an email server for sending and receiving email, a database server for storing specific structured data, and file server for storing general user files. The cloud storage array 400 couples to the local server systems (441, 442, and 443) on storage area network 450 with a first interface 461 using standard storage area network protocols to provide data storage services to the local server systems (441, 442, and 443). The cloud storage array 400 is also coupled to a cloud storage provider 491 through a second interface using an internet network connection 365 in order to take advantage of the benefits of a reliable cloud based data storage service.

The use of a storage area network interface on the cloud storage array 400 allows administrators to use the cloud storage array 400 like a conventional storage area network storage device. Multiple server systems may share the cloud storage array 400 using a standard storage area network 450. The use of a second interface 465 coupled to a cloud storage provider 491 allows the cloud storage array 400 to provide infinite storage resources that can be used as needed. As set forth in an earlier section, storage area networks allow network administrators to decouple the data storage function away from server systems such that only a single unified data storage system needs to be maintained. Thus, all of the server systems (441, 442, and 443) are coupled to a storage area network 450 that is used to handle raw data storage reads and writes. The cloud storage array 460 coupled to the storage area network 450 may handle data storage operations for the entire storage area network 450. (Note that additional cloud storage arrays or conventional storage devices may also be coupled to the storage area network 450 for additional storage.)

In the particular embodiment of FIG. 4, the cloud storage array 460 includes two different controller units: controller A 470 and controller B 480. These two different controller units may be used to provide a fault-tolerant mirrored storage system wherein either controller can take over if the other unit fails. Alternatively, the two controllers (470 and 480) may be used to "statically load balance" data volumes so that the controllers are each servicing half of the data storage requests while both controllers are healthy thereby increasing performance. When either controller fails in such a configuration, the remaining functioning controller takes on double workload, slowing down to some degree but providing continuous availability for all of the data volumes.

Controller unit A 480 and controller unit B 480 each have a local data storage system (471 and 481, respectively). The local data storage system (471 and 481) handles all data write operations from the server systems (441, 442, and 443). The local data storage system (471 and 481) also handles data read operations for data portions that happen to be stored in the local data storage system (471 and 481). The cloud storage array 460 attempts to keep all frequently accessed data within the local data storage system (471 and 481) such that the vast majority of read operations can be handled locally. However, only a subset of all the available data will reside in local data storage system (471 and 481) due to size limitations. The remainder of the data will be stored with a cloud-based data storage provider 491 available on the internet 490. This allows the user of the cloud storage array 460 to take advantage of an infinitely large storage system that is professionally maintained by experts (the data stored in the cloud-based data storage provider 491) while having local storage performance for frequently accessed data (the data stored in the local data storage system 471 and 481).

As illustrated in FIG. 4, the cloud storage array 460 acts as an intermediary between an on-site storage area network 450 and an off-site cloud-based data storage provider 491. As set forth in the previous section on cloud computing, the cloud storage array 460 must reconcile the significant differences between the front-end interface 461 to the local storage area network 450 and the back-end 465 interface to the cloud-based data storage system 491 on the internet 490.

One the most significant differences between the two interfaces on the cloud storage array 460 is the differential in speed between the connection 461 to the storage area network (SAN) 450 and the internet connection 465 to the cloud-based data storage provider 491. For example, the storage area network 450 may operate at speeds of one gigabit per second and the internet connection 465 to the data storage provider 491 may operate at ten megabits per second. This significant speed differential must be handled by the cloud storage array 460 using local storage and other techniques.

To compensate for the speed differential, the cloud storage array 460 takes advantage of the manner in which data storage systems are generally used. Most data storage systems only need to handle a relatively small amount of dynamic information that is read from and written to frequently. For example, an email server needs to receive and store new email messages every day and a file server needs to handle a limited number of files that are actively being used. However, most of the information stored on a large data storage system is generally static and infrequently accessed. For example, file servers may store archives of old documents and data related to old projects that are no longer being active used. Thus, since only a relatively small amount of data stored in a large data storage system is actively used, that limited amount of active data can be stored in the local data storage (471 and 481) that can be repeatedly accessed at a high data rate and with low latency. The data that is rarely accessed can be stored at the cloud-based data storage provider 491 and retrieved only when necessary. Accessing data from the cloud-based data storage provider 491 will often result in increased latency; however, such latency may be acceptable in certain applications or use patterns. Furthermore, such latency should rarely be encountered since only rarely used data will be stored at the cloud-based data storage provider 491.

A core concept of the cloud storage array 460 is the efficient use of the local data storage available in the cloud storage array 460. As long as the cloud storage array 460 accurately identifies the data that is most frequently accessed and keeps that frequently-accessed data in the local data storage (471 and 481), then the vast majority of storage requests (both read operations and write operations) received on the SAN connection 461 to the storage area network 450 can be serviced using only the local data storage systems (471 and 481). This will greatly reduce the amount of traffic on the connection 465 to the cloud-based data storage provider 491 thus hiding the speed differential between the two interfaces from users of the cloud storage array 460.

To most efficiently use the local storage available within the cloud storage array 460, the cloud storage array 460 uses both intelligent data tiering algorithms and storage space optimization techniques. The data tiering algorithms are used to identify the most frequently accessed data and keep that frequently accessed data in the local storage system. The data tiering algorithms may also use intelligent buffering systems like read-ahead caching to prevent cache misses. For example, by using heuristics to identify data that is likely to be requested, the cloud storage array 460 may issue outgoing requests for data currently stored at the cloud-based data storage provider 491 before receiving an incoming request for such data from one of the servers systems (441, 442, and 443). The storage space optimization techniques make the most of the available local storage space in the cloud storage array 460 by using techniques such as the identification and elimination of duplicated data as well as data compression.

In one embodiment, the local data storage systems (471 and 481) are implemented with Solid State Drive (SSD) systems and supplemented with hard disk drives. Solid state drive systems are generally implemented with a nonvolatile memory technology such as Flash memory. Primarily using flash memory instead of hard disk drives that are typically used in most storage area network device provides several advantages. For example, flash memory systems are generally faster, use less power, output less noise, and are more reliable than hard disk drive storage systems. Thus, as long as a desired data item is available in a flash memory area of a local data storage system (471 or 481), that data may be returned faster than from a cloud storage array 460 than from a traditional hard disk based storage device.

Although this document will concentrate on a system that primarily uses flash memory for the local data storage systems (471 and 481), other technologies may also be used such as hard disk drives, optical drives, battery-backed RAM memory, and any combination of these and other storage technologies. Various different storage technologies may be combined in a tiered manner. For example, battery-backed dynamic random access memory (DRAM) may be used for very frequently accessed data, flash memory may be used for frequently accessed data, hard disk drives may be used for less frequently accessed data, and a cloud-based storage system may be used for data that is rarely accessed. In this manner, the strengths of each different storage system may be taken advantage of.

In one embodiment, the administrator of the cloud storage array 460 may be allowed to allocate and configure data storage in an application dependent manner. For example, if a particular application uses a certain set of data infrequently but when that data is accessed a low latency response is needed then an administrator may be allowed to specify this limitation for that application or for that specific data such that the cloud storage array 460 does not store that particular data with the cloud-based storage provider 491. Other data sets may be explicitly marked as 'archive' data such that the designated archive data is quickly sent off to the cloud-based storage provider 491. This prevents such archive data from taking up memory space in the local storage system until the data tiering system determines that such archive data is not being accessed.

In one embodiment, the cloud storage array may allow an administrator to designate a data volume as a 100% local volume. Such a local volume may be stored in some combination of local nonvolatile memory and hard disk storage. In this manner, entire volumes may be stored locally. However, such volumes may still use the data back-up systems that will be disclosed in this document.

A cloud storage array system may use the back-up model of storage system 342 in FIG. 3. Specifically, the cloud storage array based storage system 342 may include an integrated back-up system 352 to back-up data volumes in the cloud-based data storage service 391. By using an integrated back-up system 352, the integrated back-up system 352 back-up system can take advantage of the infrastructure already provided by the cloud storage array system such as data volume slicing, compression, encryption, and systems for accessing the cloud-based data storage service 391.

Cloud Storage Array Architecture

To successfully build the cloud storage array 460 of FIG. 4, a novel storage system architecture was developed. The storage architecture was designed to handle the unique technical challenges that had to be overcome in order to provide the desired functions. In addition to many of the requirements for a typical high-quality data storage system (such as host multi-pathing, volume creation & management, back-ups & restore, RAID configurations, etc.), the cloud storage array 460 needs to handle the following issues:

Protocol translation from the SAN front-end to the cloud back-end

Hiding the latency of cloud storage using local data storage

Data snapshots for backup/restore in a distributed storage system

Reduction of back-end bandwidth requirements to access the cloud

Encryption of data stored off-site for security

Figure 5:
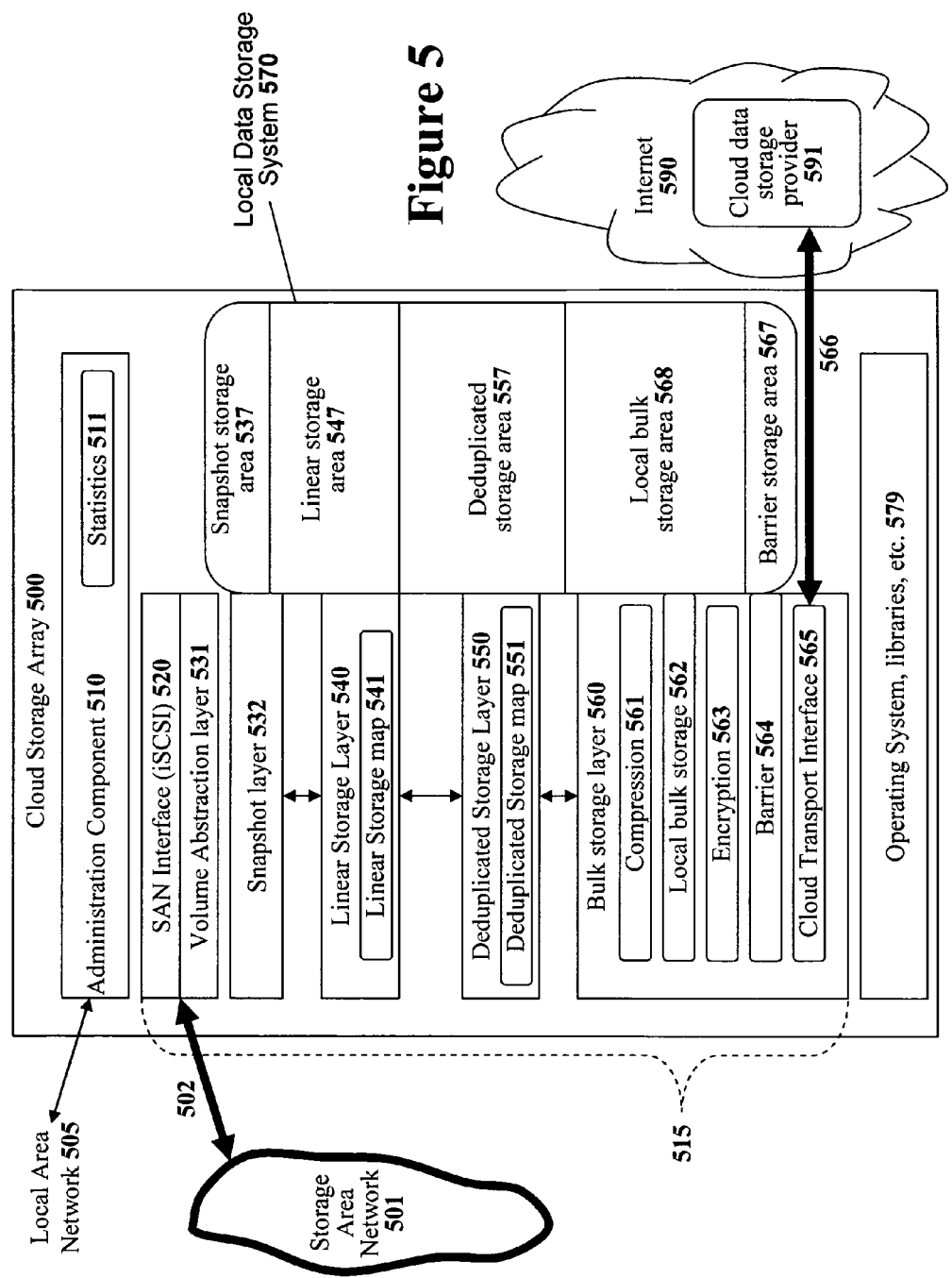
FIG. 5 illustrates a conceptual block diagram of one embodiment of an architecture used to construct a cloud storage array system.

FIG. 5 illustrates a conceptual block diagram of one embodiment of an architecture used to construct a cloud storage array 500. As illustrated in the block diagram of FIG. 5, the front-end interface 502 of the cloud storage array 500 is coupled to a storage area network (SAN) 501 to receive storage requests from local systems such as servers (not shown). The back-end interface 566 is coupled to a cloud based data storage provider 591 with an internet connection and used to store data with the cloud storage provider 591 as necessary.

The front-end interface 502 of the cloud storage array 500 will generally use well-known storage area network protocols. Examples of well-known storage area network protocols include the industry standard Internet Small Computer System Interface (iSCSI) protocol and the Fiber Channel Protocol (FCP). These protocols allow storage clients to perform operations such as start, stop, read, write, and format on data storage units addressed by logical unit numbers (LUNs).

The back-end interface 566 of the cloud storage array 500 will generally use some type of REST-ful protocol on an internet connection. The back-end interface will generally allow the cloud storage array 500 to issue commands such as create a data storage object, update a data storage object, read a data storage object, delete a data storage object, and list a data storage objects. The cloud storage array 500 addresses the individual data storage objects using some type of unique object identifier that the cloud storage array 500 must create for each data storage object. The specific interface will vary depending on the cloud based data storage provider used. However, any of the cloud based data storage providers may be used with only minor modifications.

In between the front-end interface 502 and the back-end interface 566, the cloud storage array 500 contains a complex system for responding to data storage requests. The cloud storage array 500 responds to data storage requests using a local data storage system 570 when possible or responds to requests with the help of the cloud-based data storage provider 591 when necessary. The local data storage system 570 may be constructed using one or more different types of local data storage systems such as Flash memory, battery-backed memory, and hard disk drives. The system for handling data storage requests disclosed in FIG. 5 is implemented in a manner similar to a typical protocol stack made up of independent protocol layer handlers. This document will refer to the layered system for handling data storage requests as the data storage request handling stack 515. The details of the data storage request handling stack 515 will be disclosed layer by layer.

The top layers (520, 531, and 532) of the data storage request handling stack 515 handle some formalities in processing storage requests. Beneath the formality layers are a set of data storage layers that actually handle the storage of data. A first data storage layer, the linear storage layer 540, is optimized for quickly handling data requests with data stored in a relatively raw format. A second data storage layer, the deduplicated storage layer 550, is optimized for organizing data and locally storing the data in a more space efficient. A third data storage layer, the bulk storage layer 560, is optimized for storing large amounts of data in a very dense form. The bulk storage layer may include local bulk storage 562 and/or the ability to use limitless storage size by storing data off site at a cloud-based data storage provider 591.

The bulk storage layer 560 may use local bulk storage layer 562 to provide a large amount of local storage in a local bulk storage area 568. The local bulk storage area 568 may be constructed using hard disk drives or other high-density storage systems. The local bulk storage layer 562 may be used for data volumes that must be stored locally for performance, legal, or other reasons. The bulk storage layer 562 may use compression 561 to increase the amount of storage capacity. In some embodiments, the local bulk storage layer 562 may be used in addition to cloud storage thus actually implementing a four layer data tiering system (linear storage, deduplicated storage, local bulk storage, and cloud based storage).

All the main data storage layers (540, 550, and 560) use the local data storage system 570 to some degree. In one embodiment, the local data storage system 570 is composed by two tiers of faster and slower storage (e.g. SSD and SATA disks), the linear storage layer 540 stores may use approximately 35% to 45% of the available faster tier (such as SSD) storage space for the linear storage area 547. The deduplicated storage layer 550 may use approximately 50% to 60% of the available faster tier storage space (such as SSD) for the deduplicated storage area 557. The local bulk storage layer 562 uses approximately 95% to 99% of the available slower tier (disk) storage space for the local bulk storage area 568. The barrier interface 564 may use approximately 1% to 5% of the available slower storage space for the barrier storage area 567. This particular storage allocation is only provided as an example. The storage allocation may be configurable to optimize the system for a particular installation. In one embodiment, the system uses a heuristics to dynamically adjust the storage allocations in order to automatically optimize the performance of the cloud storage array system.

Referring to FIG. 5, at the top of the cloud storage array 500 block diagram is an administration component 510. The administration component 510 is not part of the storage request handling stack but is instead a system for configuring, controlling, and monitoring a cloud storage array 500. For example, the administration component 510 can be used to schedule periodic snapshots of the data in the cloud storage array 500. An administrator may access the administration component 510 of the cloud storage array 500 through an interface coupled to a local area network 505.

For the initial configuration, an administrator specifies which virtual storage to expose to hosts on the storage area network (SAN) 501. This is similar to legacy systems where the administrator specifies which LUNs in a storage array to expose to hosts. The administrator also specifies the addresses and access information for the cloud storage provider that will be used. The administrator may specify a storage limit but this is generally not advisable since the storage system should be allowed to grow as needed.

The administrator may also specify bandwidth constraints of the communication link 566 to the cloud data storage provider 591 and bandwidth constraints of the cloud data storage provider 591 itself (the maximum rate at which the data storage provider will handle read and write requests). The bandwidth constraints of the communication link 566 can be used to ensure that the cloud storage array 500 does not attempt to send data faster than the communication link 566 can handle the data. Furthermore, if the communication link 566 is shared by other users (such as an internet connection shared with human users, mail servers, and other internet users), the cloud storage array 500 can be configured to use less than the full bandwidth available on the communication link 566.

The administration component 510 will collect operation statistics 511 that may be used to gauge the performance of the cloud storage array 500. The operation statistics 511 may be analyzed and used to alter the configuration of the cloud storage array 500 for improved performance. Each layer in storage request handling stack may generate its own individual statistics. The administration component 510 may periodically poll the different storage request handling layers and various other parts of the cloud storage array 500 to create a centralized collection of all the system statistics.

The core of the cloud storage array 500 is made up of the storage request handling stack 515. The storage request handling stack starts at the top with storage area network interface 520 and travels down through a volume abstraction layer 531, a snapshot layer 532, a linear storage layer 540, a deduplicated storage layer 550, and finally to a bulk storage layer 560. Each of these layers in the storage request handling stack will be described in further detail individually.

Front-End Interface and Initial Layers

At the top of the storage request handling stack is the storage area network interface 520. In one particular implementation that will be considered in detail, the storage area network interface 520 implements the well-known iSCSI protocol that is used to accept SCSI commands carried on a TCP/IP network. However, any other storage protocol may be implemented at the top of the storage request handling stack.

In an iSCSI embodiment, the storage area network interface 520 exposes iSCSI volumes to hosts on the storage area network (SAN) 501. The storage area network interface 520 then receives iSCSI data storage requests from the hosts such that the cloud storage array 500 must respond to those data storage requests. The storage area network interface 520 parses these iSCSI commands and determines how the commands should be handled. Many of the iSCSI requests that are not directly related to reading and writing data can be handled by the storage area network interface layer 520. Storage requests that cannot be handled by the storage area network interface layer 520 are passed down the storage request handling stack 515 to the next layer.

Beneath the storage area network interface layer 520 is a volume abstraction layer 531. The volume abstraction layer 531 handles many of the formalities in keeping track of the different volumes stored by the cloud storage array 500. For example, the volume abstraction layer 531 keeps track of the volumes that exist, the size of each volume, access control lists (ACLs), and other administrative information. Thus, the volume abstraction layer 531 handles some of the volume management tasks such that the lower layers of the storage request handling stack 515 can concentrate on actual data storage.

Snapshot Layer

The layer beneath the volume abstraction layer 531 is a snapshot layer 532. The snapshot layer 532 is used for taking "snapshots" of specified data volumes in the cloud storage array 500 upon receiving a request for a snapshot. In the present disclosure, a snapshot is the state of a volume at a particular moment in time. However, it is impractical (if not impossible) to actually make an instant copy of all the data in a particular volume. Instead, the snapshot layer 532 creates a new volume that initially only consists of a time map for the snapshot volume that specifies when the snapshot was taken and a pointer to the parent volume. If there are no new writes to the parent volume, then the current data of that parent volume can be used as the data for the snapshot volume. However, when a new write is received that changes data in the parent volume that is referenced by the snapshot volume, the old existing data must be copied out of the parent volume and placed in the snapshot volume before the write occurs in order to save the data that existed when the snapshot was created.

The copying of the existing data when a new write operation is received in order to maintain an accurate snapshot in time of a volume is known as a "copy-on-write" operation. Copy-on-write operations are used to maintain the exact data state of the volume for which a snapshot was taken. In addition, the snapshot layer 532 may use also use a system known as Copy-Reference-On-Write (CROW) that makes a copy of a reference to another volume in a system that maintains a hierarchy of snapshot volumes. The use of a Copy-Reference-On-Write (CROW) operation reduces the amount of storage required when multiple dependent snapshots exist and one snapshot may refer to data in another snapshot as long as the two snapshots remain aligned in time.

To take a snapshot of a particular data volume, the snapshot layer 532 first freezes access to that data volume. Then, the snapshot layer 532 creates an age volume map for the volume. The age volume map consists of age entries for all the data for the volume (including data within the local storage and data stored in the cloud storage). Then, the snapshot layer 532 unfreezes the data volume such that the data volume may continue to be used. However, the snapshot layer 532 will now examine every read and write to the original data volume in order to protect the data associated with the snapshot volume.

When a read is received for data volume that has had a snapshot taken, the read is processed as normal. When a write is received for data volume that has had a snapshot taken, the system determines if this is the first new write to a particular area of data since the snapshot was taken. If so, the existing data is copied and placed into a snapshot storage area to preserve the state of the data at the time the snapshot was taken.

Snapshot volumes themselves may also be read from and written to. When a read is received for a snapshot volume, the snapshot layer 532 will first determine if the data is within the snapshot storage area. If the data is within the snapshot storage area, the snapshot layer 532 will use that data (which was preserved due to an incoming write that would have destroyed the old data) to service the read request. If the requested data is not within the snapshot storage area, the snapshot layer 532 will then fetch the requested data from the parent volume (which has not yet changed or else the data would have been stored in the snapshot storage area).

When a write is received for a snapshot volume, the snapshot layer 532 will first determine if it has the current data for the volume in the snapshot storage area. If it does not yet have the data within the snapshot storage area, the snapshot layer 532 will first fetch the data from the parent volume (which has not changed yet) and place that data in the storage area. Then snapshot layer 532 will then overwrite the old data in the storage area with the new data being written to the snapshot volume.

In one embodiment, the copy-on-write policy of the snapshot layer 532 may be configured to make data copies propagate to the data storage provider 591. In this manner, when a snapshot is taken the data contents of the snapshot will be preserved in the data storage provider 591. This allows back-up snapshots to be stored at the data storage provider 591 such that no local back-up media system is required. However, since the bandwidth on the connection 566 to the data storage provider 591 is generally limited, this is a very slow procedure. Furthermore, this may consume needed bandwidth on the connection 566 for normal operations. Thus, such a system may be instructed to only send data when bandwidth is available or only during non peak times (such as overnight).

High-Speed Linear Storage Layer

After performing any needed snapshot operations in the snapshot layer 532, a data storage request is then passed to the linear storage layer 540. The linear storage layer 540 is the first level of actual data storage in the cloud storage array 500. The linear storage layer 540 is designed to handle "hot" data. Hot data is defined as data that is frequently accessed and/or changed. To provide fast performance to the hosts for this hot data, the linear storage layer 540 is optimized for speed.

The linear storage layer 540 will generally receive data storage requests addressed in traditional data storage terms such as logical volumes and logical block address (LBA) ranges. As set forth earlier, the front-end of the cloud storage array 500 can implement many different possible data storage protocols that use different data storage addressing systems. However, as long as the cloud storage array 500 properly responds to data storage requests received, the cloud storage array 500 is free to use any different type of addressing system internally. In the cloud storage array 500, data will be stored with a tiered-based storage system that uses nonvolatile memory, local disk storage, and/or cloud-based data storage. Thus, an addressing system more suited to storing information in a tiered-based storage system will be used within the cloud storage array 500 instead of the more disk-centric addressing system used by the storage area network interface 520.

In one embodiment, the cloud storage array 500 uses a flat linear addressing system for each data volume wherein each logical volume is divided into fixed sized chunks that are an even multiple of the logical blocks (SCSI logical blocks are typically 512 bytes long) used by most disk-based storage systems. A very simple translation system can be used to translate data requests made in terms of logical block address (LBA) ranges on a disk (or any other data storage addressing system) into the chunk-based linear addressing system used within the cloud storage array 500. In one specific embodiment each fixed-size chunk is 256 kilobytes long (which can fit 512 logical blocks that are each 512 bytes long), however this is merely one particular design choice. The data chunks are typically handled by the linear storage layer 540 (although help from lower data storage layers may be used). Data stored by the linear storage layer 540 is stored in the linear storage area 547 local data storage 570.

To keep track of where the all the data is stored, the linear storage layer 540 maintains a linear storage map 541 for each data volume. The linear storage map 541 specifies where each chunk of data resides (and thus how the data may be obtained). For data chunks that are stored by the linear storage layer 540, the linear storage map 541 may specify a specific physical memory address in the local data storage 570. For data that is not stored by the linear storage layer 540, the linear storage map 541 may specify a set of data fingerprints used to uniquely identify data slices in lower levels of the storage request handling stack 515 such as the deduplicated storage layer 550 and the bulk storage layer 560. In one embodiment, a thirty-two byte long SHA-256 fingerprint is used to uniquely identify data slices stored in the lower storage layers.

Figure 6:
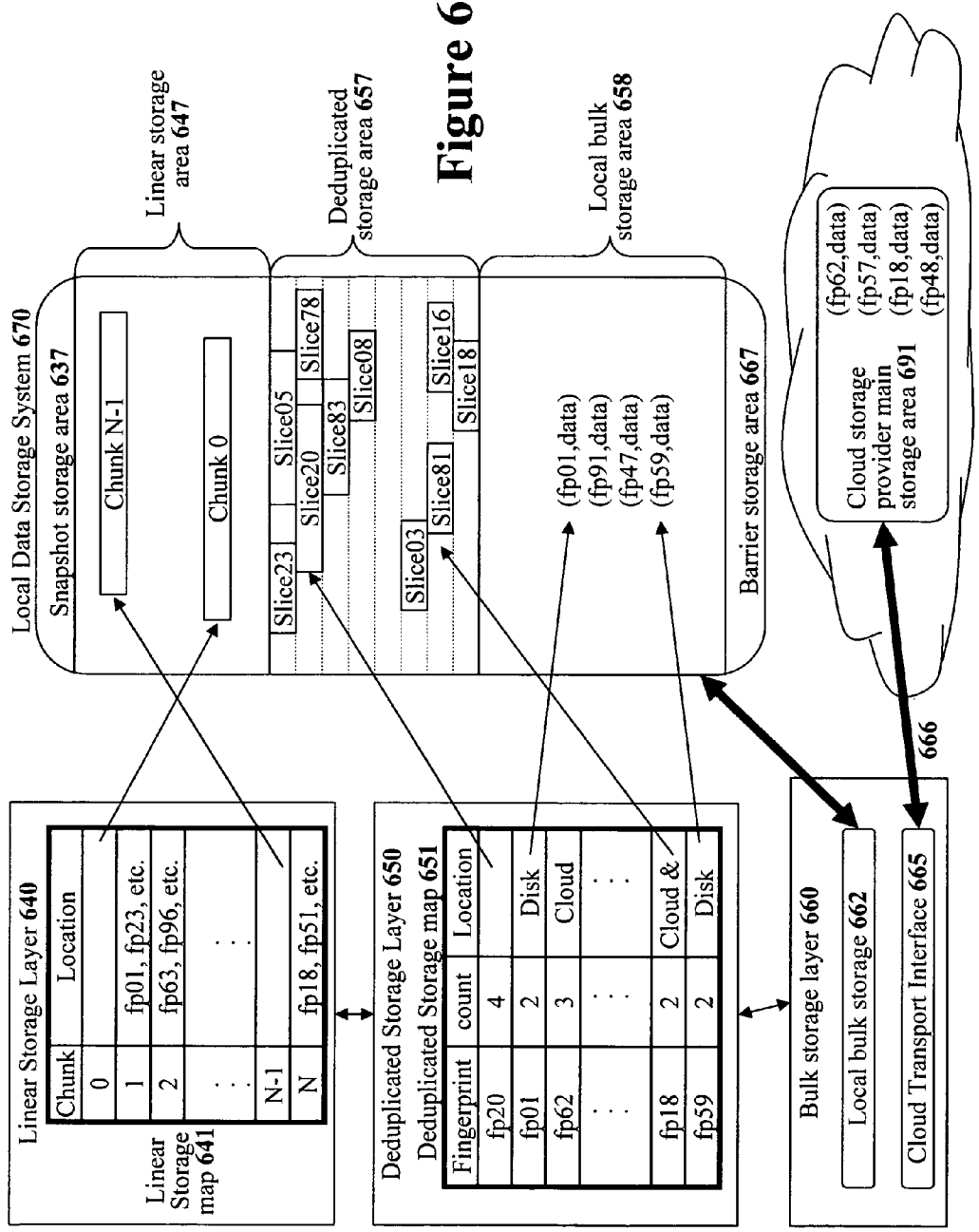
FIG. 6 conceptually illustrates a set of data storage layers in one embodiment of a cloud storage array system.

FIG. 6 conceptually illustrates how the various data storage layers use the local data storage system 670. (Note that FIG. 6 is conceptual only and that many details are omitted for clarity.) The linear storage layer 640 uses a linear storage map 641 that maps each (fixed-size in one embodiment) chunk either to a location in a linear storage area 647 of the local data storage system 670 or provides the fingerprint identifiers that represent the data. The fingerprint identifiers are used to locate the requested data in lower layers of the storage request handling stack. In the example of FIG. 6, chunk 0 is stored in the linear storage area 647 as indicated by a pointer. Chunk 1 is stored in lower data storage layer(s) since the linear storage map 641 specifies a set of fingerprint identifiers. Each of the fingerprint identifiers specifies a data slice of the data chunk. The set of data slices is equal to the size of a data chunk (which is 256K in one particular embodiment).

The linear storage map 641 may be implemented with an ordered linked list that links together entries each containing a pointer to a chunk of data in the linear storage area 647 or a set of fingerprint identifiers for data stored in a lower layer. For the data that is stored in lower layers, the linked list entries will contain a series of entries with fingerprints where the total size of the data slices referred to by the fingerprint identifiers equals one chunk size. To provide optimal performance, the linked list may also have an additional data structure used to improve the search of the linked list. For example, a red-black tree, a hash table, or another similar data structure whose elements are pointers to the linked list nodes may be used to improve the speed of searching the linked list.

Figure 7:
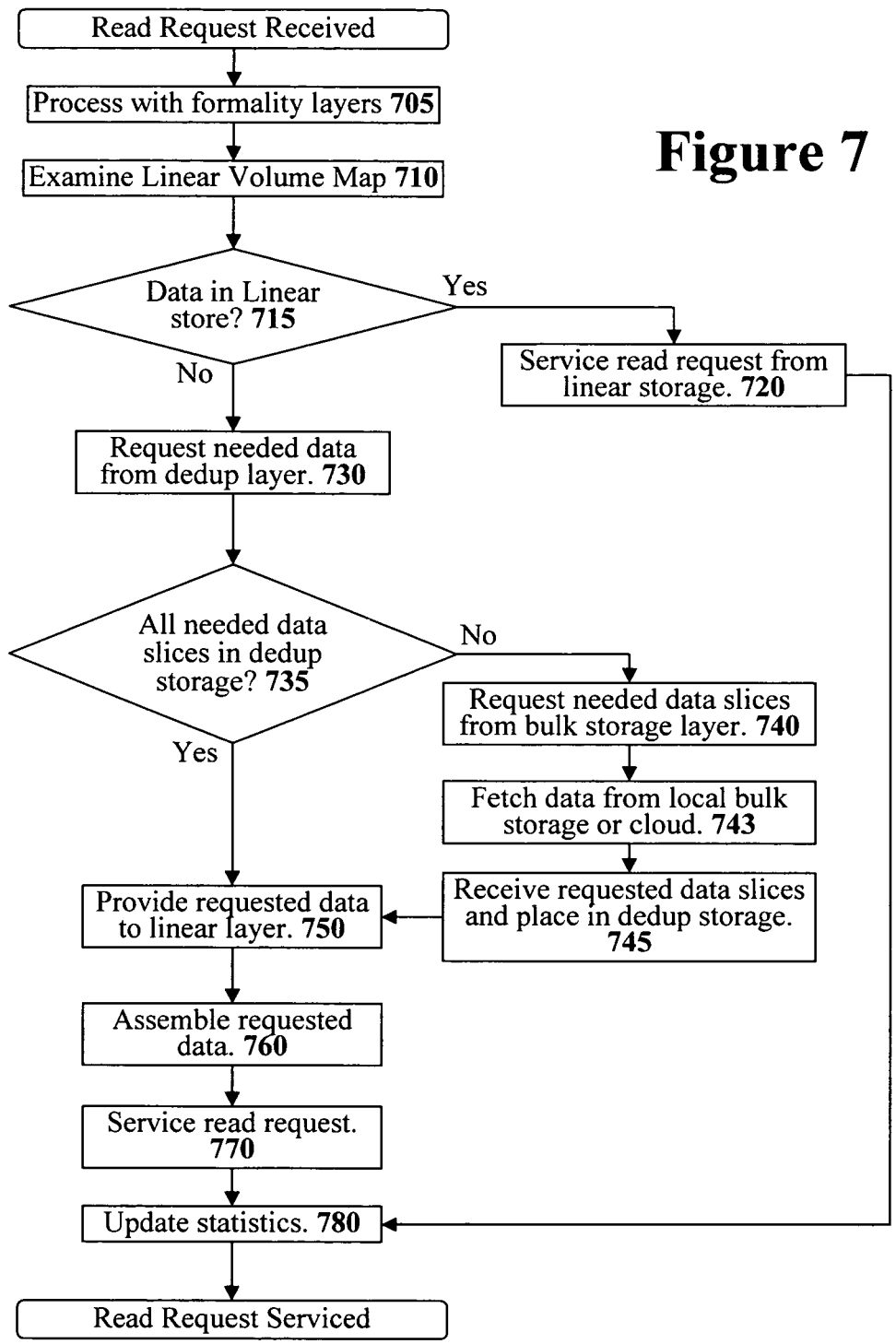
FIG. 7 illustrates a flow diagram that describes how a cloud storage array system may respond to a read request received from a client system.

A description of how the linear storage layer 640 handles read requests will be disclosed with reference to a flow chart presented in FIG. 7 and the conceptual diagram of FIG. 6. Referring to FIG. 7, a read request is received from a host client at the top of the flow chart. The read request is first processed by the SAN interface layer, the volume abstraction layer, the snapshot layer, and any other initial layer at stage 705. The read request is then passed to the linear storage layer 640.

The linear storage layer 640 first examines the linear storage map 641 for the volume at stages 710 and 715 to determine how to respond to the read request. If the requested data is available in the linear storage area 647 of the local data storage system 670 then handling the response can be done very quickly and easily. Specifically, the linear storage layer 640 simply reads the data from the linear storage area 647 and responds to the read request at stage 720. The system may then update some statistics (such as statistics used to determine if the data is hot, warm, or cold) at stage 780 and it is then done handling the read request.

If the data was not found to be in the linear storage area 647 at stage 715, then the linear storage layer 640 requests the needed data from lower layers of the storage request handling stack at stage 730. The request is made by providing the fingerprints of the needed data items. Note that a read request may only need a few slices of data if the read request only requested a small amount of data within a particular chunk of data. In this particular embodiment, the next lower layer is the deduplicated storage layer 650 in FIG. 6. This document may use the term 'dedup' when referring to aspects the deduplicated layer.

At stage 735, the deduplicated storage layer 650 examines the deduplicated storage map 651 to determine if the deduplicated storage layer 650 has all the requested data slices in the deduplicated storage area 657 of the local data storage system 670. If the deduplicated storage layer 650 has all the needed data slices, then the deduplicated storage layer 650 can respond with the requested data at stage 750. If the deduplicated storage layer 650 does not have all the needed data slices the deduplicated storage layer 650 will request the needed data items then at stage 740. In this particular embodiment, the request will be made to the next lower layer of the storage request handling stack, the bulk storage layer 660.

At stage 743 the bulk storage layer 660 fetches the requested data. Depending on where the requested data resides, the bulk storage layer 660 may request the data from the local bulk storage, the cloud storage provider 690, or both. (More details on this stage will be presented in the section on the bulk storage layer 660.) Upon receiving the requested data, the deduplicated storage layer 650 will place the requested data into the deduplicated storage area 657 of the local data storage system 670. The deduplicated storage layer 650 can then respond to the linear storage layer 640 with the requested data at stage 750.

Upon receiving the requested data slices from deduplicated storage layer 650, the linear storage layer 640 will assemble the requested data from the received data slices at stage 760. Finally, the linear storage layer 640 can then respond to the read request with the requested data at stage 770. The statistics counters can then be updated at stage 780.

It can be seen that servicing the read request at stage 720 will be faster than servicing the read request when the data must be fetched from the lower data storage layers. This is especially true if data slices must be fetched from the cloud-based data storage provider 691 across communication link 666.

Write requests are handled in a similar manner. All write operations to the cloud storage array are initially written into the linear storage area 647 associated with the linear storage layer 640. The handling of a write request will be disclosed with reference to the flow chart of FIG. 8 and the conceptual diagram of FIG. 6. The example of FIG. 8 describes a write to a single data chunk. However, the same steps may be performed multiple times to handle writes to multiple data chunks.

Figure 8:
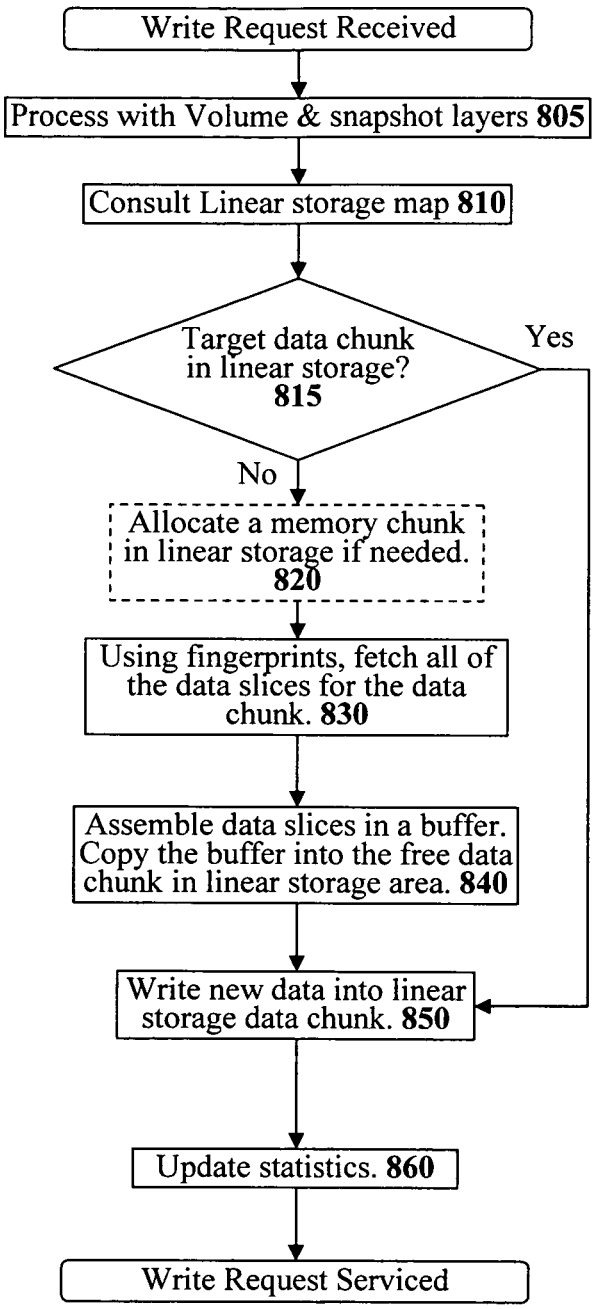
FIG. 8 illustrates a flow diagram that describes how a cloud storage array system may respond to a write request received from a client system.

Referring to FIG. 8, a write request is received from a host client at the top of the flow chart. As with a read request, the write request is first processed by initial formality layers such as the SAN interface layer, the volume abstraction layer, and the snapshot layers at stage 805. The read request is then passed to the linear storage layer 640.

The linear storage layer 640 first examines the linear storage map 641 for the volume at stages 810 and 815 to determine how to handle to the write request. If the write is directed at a data chunk that is already available in the linear storage area 647 of the local data storage system 670 then handling the write request can be done easily. Specifically, the linear storage layer 640 may proceed to stage 850 and write the new data into the appropriate data chunk within the linear storage area 647 at stage 850. The system may then also update some statistics at stage 860. At this point, the write request has been fully handled.

If the data chunk that the write is directed at was not found to be in the linear storage area 647 at stage 815, then the linear storage layer 640 will generally first pull the data for target data chunk into the linear storage layer 640. The reason that data is pulled up into the linear storage layer 640 before it is overwritten is so that if a failure occurs during a write operation, the failure will at least leave the old data which has been partially over-written by new data. This is the way that a traditional disk based storage system operates such that application programs are already prepared to handle corrupted data due to such a write failure.

To pull the data up into the linear storage area 647, the linear storage layer 640 may first need to allocate a new chunk of memory in the linear storage area 647 at stage 820. (Ideally, the system will always keep a few memory chunks available for handling new incoming write options.) Allocating a new memory chunk may be performed by pushing data from an existing chunk in the linear storage area 647 down to the next lower data storage layer. Pushing a data chunk down to the next data storage layer will be described in the next section of this document about the deduplicated storage layer 650.

With a memory chunk available in the linear data storage area 647, the linear storage layer 640 then requests all the data slices for that data chunk from the lower data storage layers of the storage request handling stack at stage 830. The request for the data slices is made by providing the fingerprint identifiers of the needed data slices. Note that all of the data slices for the data chunk are required since the entire data chunk will now be represented in the linear storage area 647 as a single data chunk. If the deduplicated storage layer 650 does not have all the needed data slices for the chunk in the deduplicated storage area 657, then the deduplicated storage layer 650 will request the needed data slices from the next lower layer of the storage request handling stack (the bulk storage layer 660 in this particular embodiment).

After receiving the requested data slices, the linear storage layer 640 then assembles the data slices in a buffer at stage 840. The fully assembled data chunk is then copied into the free memory chunk in linear storage area 647 such that the linear storage layer 640 is now fully responsible for that particular data chunk. Thus, the linear storage layer 640 updates the linear storage map 641 to reflect that the linear storage layer 640 now has that particular chunk of memory represented within the linear storage area 647.

It should be noted that the fetched data slices will generally be allowed to remain down in the deduplicated storage area 657. A primary reason that these data slices will continue to be in the deduplicated storage area 657 is that other areas of the data volume (or other data volumes) may refer to the fetched data slices. If a data slice is not referenced by another data chunk then a garbage collection mechanism may eventually discard that unreferenced data slice.

Unreferenced data slices may be allowed to remain in the deduplicated storage area 657 for some time. There is actually a benefit in keeping unused data slices in the deduplicated storage area 657 for a period of time. Specifically, a data chunk that was pulled up from the deduplicated storage layer 650 (or lower layers) up into the linear storage layer 640 may soon be pushed back down to the deduplicated storage layer 650. When this occurs, the pre-existing data slice in the deduplicated storage area 657 may be used again if the data slice still represents a portion of the data chunk.

Referring back to FIG. 8, after the data chunk has been fully moved back up into the linear storage area 647, the linear storage layer 640 may then over-write the data chunk at stage 850. In the unlikely event of a failure during the write, the data chunk will contain a mix of new data overwritten onto old data. As set forth above, this is a situation that existing application programs are already prepared to handle.

Finally, at stage 860, the system may update some statistics. For example, a counter associated with the data chunk may be incremented to indicate that the data chunk has recently been accessed. This counter value may be used by a data tiering algorithm to determine if the data chunk should be kept in the linear storage layer.

As set forth earlier, the cloud storage array organizes data in different data tiers. The first tier is the fast linear storage layer and the second layer is the slightly slower deduplicated layer. The lower bulk storage layer stores data on a local bulk storage system and/or with a cloud data storage provider. For some applications where reliable data storage is paramount, the system may be configured to push every new write to lower layers of the storage request handling stack such that the bulk storage layer will eventually store data in the local bulk storage and/or with the data storage provider 691. Note that various writes may be superseded by newer writes to the same location such that not all writes will actually propagate all the way through to the bulk storage layer. Configuring the system in this manner may reduce the performance of the cloud storage array 600 but may be desirable for applications wherein reliable data storage is paramount since the data will (almost) always be propagated onto a local bulk storage system and/or out to the cloud based data storage provider 691 for safe keeping.

In most circumstances, the cloud storage array will only push data down to lower layers of the storage request handling stack when the linear storage layer 640 determines that a particular data chunk needs to be evicted from the linear storage area 647. For example, a data chunk may be evicted to make room for new data in the linear storage layer 640. The eviction policy may use eviction policies similar to common cache replacement strategies. For example, the system may use the well-known least-recently used (LRU), least-recently allocated (LRA), or least-frequently used (LFU) cache replacement policies to determine when a data chunk may be evicted from the linear storage layer 640.

In normal operation, the full contents of the cloud storage array 600 will generally not fully propagate to the bulk data storage. However, there is nothing wrong with this (nor would it be desirable) since all of the data stored within cloud storage array 600 is stored in some nonvolatile form (such as a solid state drive or a hard disk drive) that is much easier to access than data in the cloud storage. Snapshots of data stored in the cloud storage array 600 can also be periodically backed-up (as will be described in a later section of this document) or proactively pushed to the cloud storage for disaster recovery purposes.

Memory Efficient DeDuplicated Layer

Referring back to FIG. 5, when the linear storage layer 540 determines that a particular data chunk is not being frequently accessed, the linear storage layer 540 sends that data chunk down to the deduplicated storage layer 550 for memory efficient storage in the deduplicated storage area 557. The deduplicated storage layer 550 acts as a repository for "warm" data. Warm data may be defined as data that is not as frequently accessed as the "hot" data in the linear storage layer 540 but still accessed regularly and typically read more often than written. As the name implies, the deduplicated storage layer 550 removes duplicates from the data such that the deduplicated storage layer 550 stores data much more efficiently than the linear storage layer 540.

In the deduplicated storage layer 550, a data fingerprint (such as a SHA-256 fingerprint) of a data slice is used as an identifier for the data slice. The deduplicated storage layer 550 uses deduplicated storage map 651 to keep track of where each data slice is stored within the deduplicated storage area 557 of the local data storage system. FIG. 6 illustrates a conceptual diagram of the deduplicated storage map 651 and the deduplicated storage area 657 of the local data storage system 670.

As illustrated in FIG. 6, the deduplicated storage map 651 may be implemented as a table that identifies the storage location of each data slice received from the linear storage layer 640. In practice, the deduplicated storage map 651 may be implemented as a hash table (or similar data structure) to optimize search performance. In one particular embodiment, the deduplicated storage map table 651 maps each data slice fingerprint to the location where the actual data slice resides. A data slice may be stored within the deduplicated storage area 557, in the local bulk storage 658, at the cloud storage provider 691, or at some combination of those locations.

Various different systems may be used to implement the functionality of the deduplicated storage map 651. For example, in one embodiment the deduplicated storage map table 651 only specifies the location of a data slice in the deduplicated storage area 557 or else specifies that a lower layer handles that data slice. In such an embodiment, the bulk storage layer 660 would implement its own storage map that identifies where data slices reside within the local bulk storage area 658. In other embodiment, the deduplicated storage map 651 specifies a location of where a data slices exists in the deduplicated storage area 557 or in the local bulk storage area 658 but any data slice not in the map will be presumed to be stored at the cloud storage provider 691.

Figure 9:
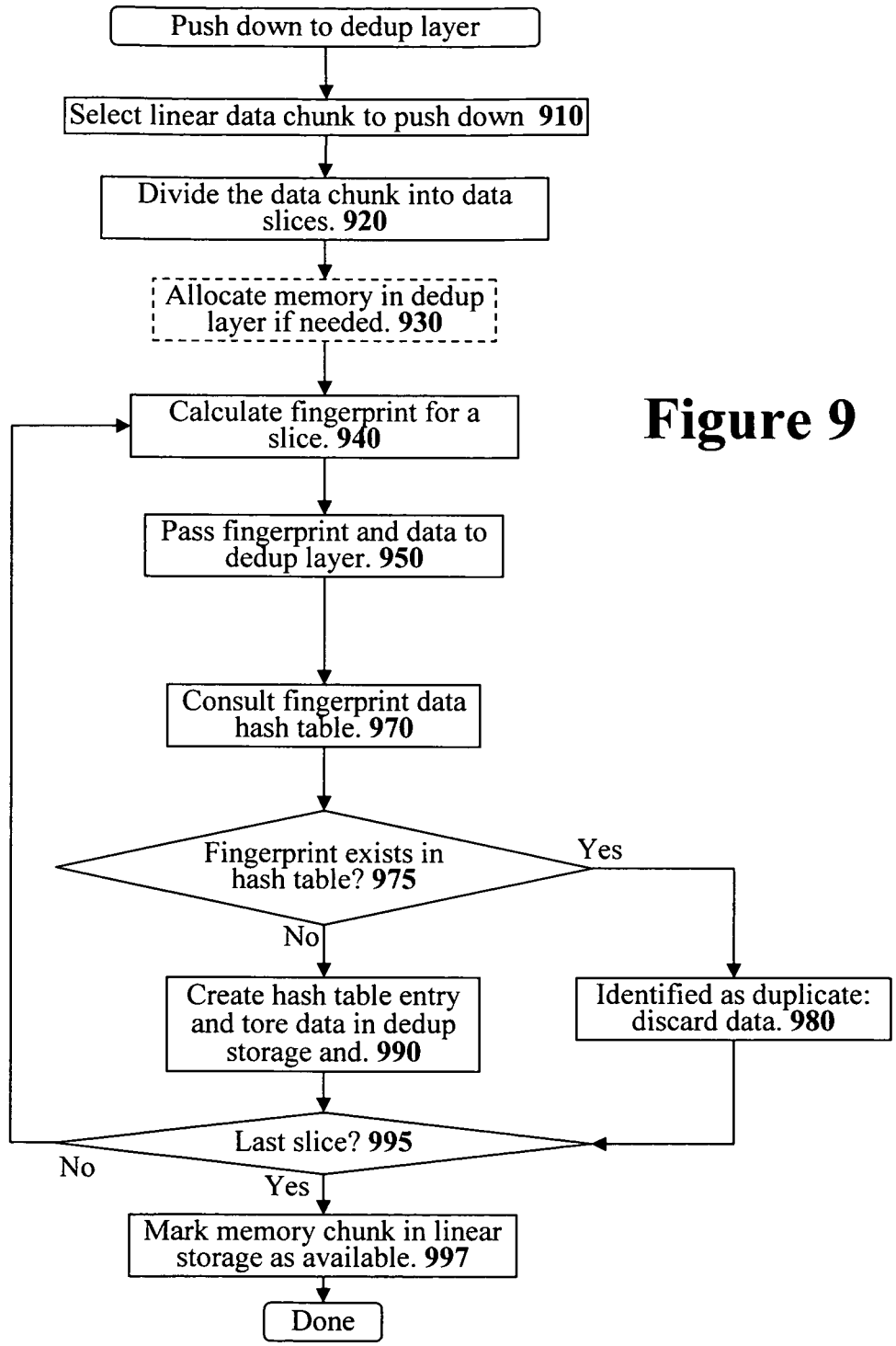
FIG. 9 illustrates a flow diagram that describes how a cloud storage array system may divide a chunk of data into data slices and remove duplicates.

FIG. 9 illustrates a flow diagram describing how data slices are pushed down from the linear storage layer 640 to the deduplicated storage layer 650. First, at stage 910, the system must select a linear chunk to push down. In one embodiment, the linear storage layer 640 uses a "least recently allocated" (LRA) policy to determine when a particular data chunk should be pushed down to a lower data storage layer.

Note that the linear storage layer 640 may push data chunks down to the deduplicated storage layer 650 for several different reasons. The linear storage layer 640 may push data chunks down to make room for new data in the linear storage layer 640. This may be performed by a background process that attempts to keep the linear storage area 647 approximately 85% full in one particular embodiment. This allows a large amount of data to be stored but keeps the linear storage layer 640 prepared to accept a new burst of data writes. The linear storage layer 640 may push data chunks down to force those data chunks to migrate to the cloud storage. The linear storage layer 640 may also push data chunks down to force the deduplicated storage layer 650 to break the data chunks into fingerprinted data slices for back-up purposes as will be described in a later section of this document.

After selecting a data chunk to push down, the linear storage layer 640 then divides the data chunk into a set of individual data slices at stage 920. Many different techniques may be used to slice a data chunk into a set of data slices. The goal is to slice the data chunk up into individual data slices in a manner that will result in a high probability of finding duplicate data slices.

In one particular embodiment, the data chunk is sliced up using Rabin fingerprints. A Rabin fingerprint is a progressive polynomial that is calculated over a defined window. It is progressive since successive Rabin fingerprints may be calculated by dropping of a byte from one end of the defined window and adding another byte to the other end of the defined window. This allows a Rabin fingerprint to sweep through a chunk of data dividing it into data chunks.

Figure 10:
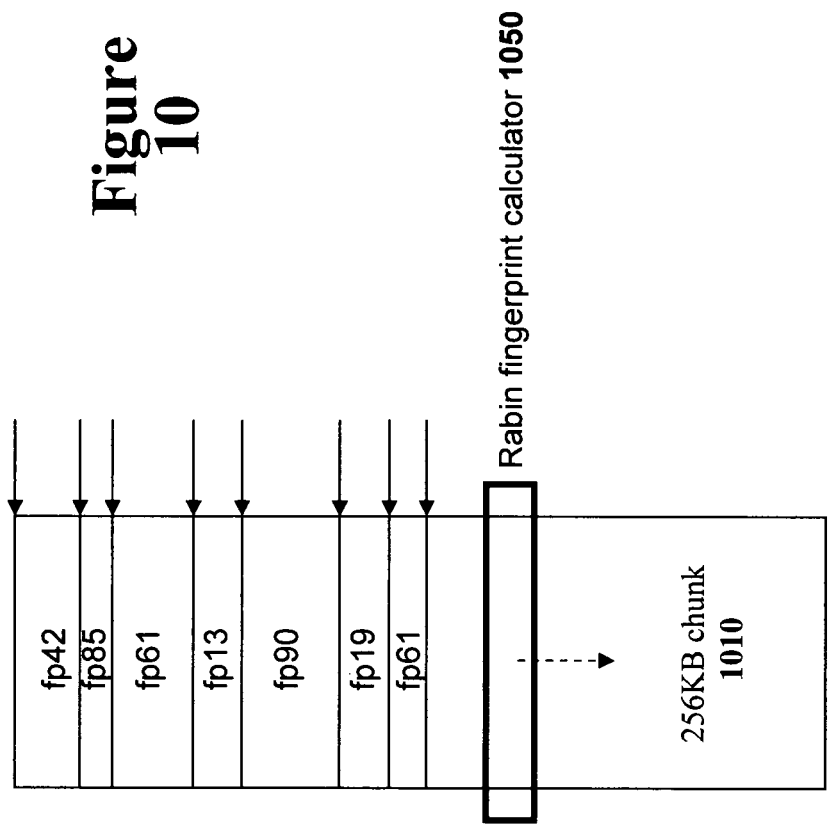
FIG. 10 is a conceptual diagram that illustrates how a chunk of data may be divided into data slices using a progressive fingerprint calculated over a moving window.

FIG. 10 illustrates how a Rabin fingerprint calculator window 1050 may sweep through data chunk 1010 progressively calculating Rabin fingerprints. The Rabin fingerprint system may be used to sweep through the data chunk 1010 and periodically drop anchors to define data slices. An anchor may be dropped when the Rabin fingerprint equals some arbitrary value. In one embodiment, the system creates data slices that start at a first anchor defined by the beginning of the data chunk or the previous anchor, are at least 8K bytes long, and end when the specified arbitrary Rabin fingerprint value is generated or a 64K limit is reached (which ever occurs first). This will create data slices that are between 8K and 64K in length. If the arbitrary value is selected as a value with 16 zeroes in the least significant bits of the binary Rabin figure print, the data slices will average to be around 16K in size.

Referring back to FIG. 9, at stage 930 the system then may need to allocate space in the deduplicated storage area 657 if no space is available. This may be done by selecting a least recently allocated chunk of space in the deduplicated storage area 657 and pushing the data slices in that area down into the next lower layer (the bulk storage layer 660 in this embodiment). Note that, like the linear storage layer 640, the deduplicated storage layer 650 may also have a background process running that always attempts to keep the deduplicated storage area 657 approximately 85% filled such that the deduplicated storage layer 650 stores a large amount of data but can still always accept new data.

After dividing the data chunk into data slices and ensuring that space exists in the deduplicated storage layer 650, the linear storage layer 640 then begins to push down individual data slices. At stage 940, the linear storage layer 640 first calculates a data fingerprint for a data slice. This fingerprint is a statistically unique identifier fingerprint such as a SHA-256 fingerprint. The linear storage layer 640 then provides the data slice and the fingerprint for the data slice to the deduplicated storage layer 650 at stage 950. (The data may be provided by simply passing a pointer to the data slice.)

Next, at stage 970, the deduplicated storage layer 650 examines the fingerprint that it receives and searches the deduplicated storage map 651 to see if there is already an existing identical data slice already stored in the deduplicated storage area 657 or in a lower data level. With sufficiently strong fingerprints that have a very low probability of aliasing, simply comparing the fingerprints may be enough to identify duplicate data. In an alternative system, the deduplication may be performed in two stages. A first stage can use probabilistic methods to locate potential duplication candidates. After identifying candidates for deduplication, exhaustive algorithms verify the duplicated data and possibly adjust the data slice boundaries to obtain more duplicated data slices.

If the deduplicated storage layer 650 identifies redundant data, the deduplicated storage layer 650 may discard the data at stage 980. In embodiments wherein the system maintains a reference counter to keep track of how many different data chunks refer to a particular data slice, the system may increment that reference counter. When a received data slice is not yet represented in the deduplicated storage layer 650 (the same fingerprint was not found in the deduplicated storage map 651), then the deduplicated storage layer 650 adds that data slice to the deduplicated storage map 651 at stage 990. Specifically, the deduplicated storage layer 650 stores the data slice in the deduplicated storage area 657 and creates a new entry in the deduplicated storage map 651 (which may be a hash table) that points to the newly added data slice.

At stage 995, the linear storage layer 640 determines if this was the last data slice of the data chunk to push down. If it is not, the linear storage layer 640 returns back to stage 940 to push down another data slice. If this was the final data slice, then the linear storage layer 640 may now update the linear storage map 641 by removing the reference to the data chunk in the linear storage area and adding entries that refer to all the fingerprints of the data slices in the linear storage map 641. Thus, when a subsequent memory request is received that refers to data in the range of that particular memory chunk, the system will need to access the data slices now stored in the deduplicated storage area 657 (or in lower data layers).

By removing duplicated data at stage 975, the deduplicated storage layer 650 greatly increases the storage efficiency. This allows many more logical volumes of data to be stored in the layers beneath the linear storage layer 540 that only stores in a raw unprocessed form. However, this increased data storage efficiency comes at a cost. The linear storage layer 540 must slice up each data chunk and calculate fingerprints for each data slice. And the deduplicated storage layer 550 must search for duplicated data. Furthermore, pushing data into the deduplicated storage layer 550 involves significant metadata updates to maintain the deduplicated data storage map 651. However, since processing power is now very inexpensive and the bandwidth of the intermediate layers is far greater than the bandwidth to the cloud data storage, this is a worthy trade-off.

Another cost for the improved memory efficiency is that when a read request is received for data in the deduplicated storage layer 650, that read request must be satisfied with data from the deduplicated storage area 657. Thus, the linear storage layer 640 must fetch each needed data slice from the deduplicated storage layer 650 and then reassemble the data slices to obtain the requested data. This means that the latency time for read requests that are serviced by the deduplicated storage layer 650 will be higher than the latency time for read requests that are serviced by the linear storage layer 640. However, this latency difference is relatively small and worth the trade-off since it allows more data to be stored within the high-speed area of the local data storage 670. Storing more data in the high-speed area of the local data storage 670 will mean fewer accesses to the bulk storage layer 660 (that stores data in local bulk data storage or with the off-site cloud data storage provider 691) which will have a much greater latency time.

Referring back to FIG. 5, the deduplicated storage layer 550 acts as a relatively fast local tier of data storage. The "warm" data in the deduplicated storage layer 550 is not accessed as frequently as the data in the linear storage layer 540 but data in the deduplicated storage layer 550 is still accessed on a fairly regular basis. Although, the deduplicated storage layer 550 stores data more efficiently, the deduplicated storage layer 550 will eventually run out of storage space. When the deduplicated storage layer 550 runs out of storage space, the deduplicated storage layer 550 must begin to evict existing data slices to make room for new data slices. The deduplicated storage layer 550 will push the evicted data slices further down the storage request handling stack 515.

Note that data eviction policies used by the deduplicated storage layer 550 may be the same, similar, or different than the data eviction policies used by the linear storage layer 540. Referring to FIG. 6, some implementations of the deduplicated storage layer 650 may maintain a 'reference counter' value in the deduplicated data storage map 651 that maintains a count of the number of times each data slice is referenced by a data chunk. In embodiments that implement such a reference counter, the reference counter may be used by the data eviction algorithm such that data slices that are referenced many times are less likely to be evicted from the deduplicated storage layer 650.

In addition to pushing data down in order to make more storage space available the deduplicated storage layer 550, the deduplicated storage layer 550 may proactively push data slices down to the bulk storage layer 560 before it is necessary to do so. In particular, it can be very advantageous to proactively push data out to the cloud storage provider before being requested to do so. This allows the bandwidth of the communication link to the cloud data storage provider 591 to be used more efficiently since data slices can be sent when there is idle bandwidth. However, the data slices may also remain within the deduplicated storage layer 550 such that read requests for those data slices may be serviced quickly. When such data slices need to be completely evicted from the deduplicated storage area 557, the data slices that have already been pushed out to the cloud storage provider can simply be removed from the deduplicated storage area 557.

Bulk Storage layer

Data storage requests that cannot fully be serviced by the previous two data storage layers are handled the bulk storage layer 560. The bulk storage layer 560 is used to store "cold" data that is rarely accessed. The bulk storage layer 560 handles two different data storage systems: a local bulk storage system 562 and a cloud transport interface 565 stores data with a cloud storage provider 591. How these two data storage systems are handled by the bulk storage layer 560 depends on the particular configuration of the cloud storage array 500.

In one configuration, the bulk storage layer 560 will only use the local bulk storage system 562 as a primary data storage device. In such an embodiment, the cloud transport interface 565 will only be used when performing back-up operations. A local storage only configuration ensures that all of the data will always be available locally such that if the data link 566 were to malfunction, all of the data would still be available locally. Furthermore, the worst case response time for a local storage only will be faster than if cloud storage is used.

In another configuration, the bulk storage layer 560 uses the local bulk storage system 562 and the cloud storage provider as successive data tiers thus providing a four tiered storage system (linear storage, deduplicated storage, local bulk storage, and cloud storage). In such an embodiment, there will be three different layers of local storage (linear storage, deduplicated storage, and local bulk storage) and fourth infinitely extensible cloud storage layer. Such an embodiment would never run out of storage space due to the use of cloud storage.

In another yet another configuration, the bulk storage layer 560 would lack a local bulk storage system 562 and instead rely upon the cloud storage provider 591 when the local data storage system 570 became full. If such an embodiment were constructed without any disk drive, such a system would be very reliable due to the lack of any moving parts.

Local bulk storage 562 system in the bulk storage layer 560 stores data slices in a local bulk storage area 568 that may be implemented with a hard disk drive. To further improve the data storage capacity, the local bulk storage 562 system may use a compression layer 561 to compress data slices before storing the data in the local bulk storage area 568. Details on how the compression layer 561 works will be presented below while describing the operation of cloud storage.

If the bulk storage layer 560 opts to use cloud storage then the bulk storage layer 560 will use the cloud transport interface 565 to store data out at the data storage provider 591. Since it takes time to retrieve data from the off-site data storage provider 591, there will generally be a larger latency period for any data storage request that requires access to the off-site data storage provider 591. Ideally such latency should only occur when accessing old data archives since the vast majority of the frequently used data should be represented in the local storage system 570 of the cloud storage array 500.

When the bulk storage layer 560 uses cloud storage, the bulk storage layer 560 first prepares the data slices to be sent to the data storage provider 591. The bulk storage layer 560 may first compress the data using compression stage 561. The compression of the data accomplishes two goals. First, the compression reduces the bandwidth requirements for the internet connection 566 to the data storage provider 591 since less data needs to be transmitted. This is very important since this reduces the large disparity between the bandwidth at the front-end storage area network connection 502 and this back-end internet connection 566 to the data storage provider 591. Second, the compression also reduces the amount of data that needs to be stored by the data storage provider 591 such that outsourced data storage costs are minimized.

Figure 11:
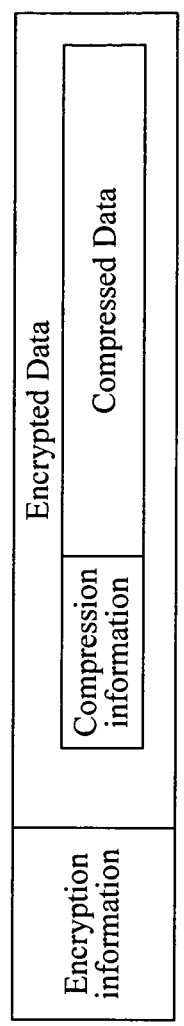
FIG. 11 illustrates a block diagram of a data slice that has been compressed and encrypted with extendible compression and encryption systems.

Any suitable compression system may be used but in one embodiment the BZIP compression system is used. In another embodiment, the compression system allows for multiple different compression systems to be used. To do this, the compression stage 561 may prepend compression information to the compressed data as illustrated in FIG. 11. The compression information may include a code to that specifies a particular compression algorithm and version. This allows the compression stage 561 to select the proper decompression system when multiple different compression systems are used. Such a system may be able to select the optimum compression system for a particular data slice.

After compressing the data, the compressed data is then encrypted with encryption stage 563. By encrypting the data, the owner of the cloud storage array 500 does not need to fear for their data security. The encryption prevents any person tapping the internet connection 566 or examining the data stored at the storage provider 591 from being able to view the real meaning of the data.

Many different data encryption systems may be used within the encryption stage 563. In one particular embodiment, the AES-256 encryption system was implemented within the encryption stage 563. As with the compression stage, the encryption stage 563 may allow multiple different encryption systems to be used. To do this, the encryption stage 563 may prepend encryption information to the encrypted data as illustrated in FIG. 11. The encryption information allows the encryption stage 563 to select the proper decryption system and version when multiple different data encryption systems may be used. The prepended encryption information may also specify the size of the data since some encryption systems only operate on fixed size data and thus require padding bytes. Note that the use of pre-pending compression and encryption information allows new compression and encryption systems to be added to the cloud storage array 500 at any time.

The use of prepended encryption information may also be used to help with encryption key management. Encryption keys may be changed on a regular basis to improve the data security. A code may be placed into the prepended encryption information to help select the proper key for data decryption. In one embodiment, the system allows an administrator to use a passphrase to generate an encryption key. Multiple levels of authority may be used to protect keys from be lost. In addition, a built-in system may allow a customer to contact the manufacturer of the cloud storage array 500 system if the passphrase for an encryption key has been lost.

After data encryption, a barrier stage 564 stores a copy of the compressed and encrypted data in a barrier storage area (667 in FIG. 6) of the local storage system 570. The barrier storage area 667 is used to temporarily store a copy of data that is in the process being transmitted to the data storage provider 591. The barrier storage may be in SSD or on a hard disk drive.

The data is kept in the barrier storage area 667 for a 'settlement period' that allows the data storage provider 591 to perform its own data storage tasks. (If data sent to the data storage provider 591 were requested too soon, the data storage provider 591 may fail at providing the data since the data storage provider 591 may not be ready to respond to data queries yet.) Thus, when the bulk storage layer 560 receives a read request for data stored at the cloud data storage provider 591, the bulk storage layer 560 first checks the barrier storage area of the local storage system 570 to see if the data is available there. If the requested data is located in the barrier storage area of the local storage system 570 then the bulk storage layer 560 will respond to the data request using that data is located in the barrier storage area.

Note that by compressing the data before the data is stored in the barrier storage area, the bulk storage layer 560 efficiently uses its allocated area of the local storage system 570. However, this comes at the expense of having to decrypt and decompress the data if a read request is received for data stored in the barrier storage area. In an alternate embodiment, the data is stored in the barrier layer before compression and decryption. In such an embodiment, there will be a lower latency period when responding from the data stored in the barrier storage area. However, since data temporarily stored in the barrier storage area will rarely be requested, the implementation that stores compressed and encrypted data will generally be the better implementation.

In addition to allowing transmitted data to settle at the data storage provider 591, the barrier stage 564 serves additional purposes. One important purpose is to handle storage request serialization. Many cloud data storage providers will perform data storage requests received in close time proximity out of the order that the data storage requests were received in. Thus, if a purge request is transmitted and then a write request to the same data location was subsequently transmitted, the cloud data storage provider 591 might reverse the order of these requests and thus destroy data! To prevent this potential disastrous occurrence, the barrier stage 564 will place a long waiting period between data storage requests that refer to the same data location.

After storing a copy in the barrier storage area, the compressed and encrypted data is provided to a cloud transport interface stage 565 that is responsible for transmitting data to the data storage provider 591. The cloud transport interface stage 565 first creates a new data object within the cloud data storage provider 591 to store the data. In one embodiment, the system uses the same the fingerprint identifier from the deduplicated storage layer 550 as the name for the data object. The cloud transport interface stage 565 then writes (transmits) the data to the newly created data object. The cloud transport interface stage 565 then allows for the settlement period wherein it waits a specified amount of time before the data can be read back from the data storage provider 591. This settlement period is a time value that may be configured based upon the particular data storage provider 591 that is being used. Once the settlement period expires, the cloud transport interface stage 565 deletes the copy of the data that was placed in the barrier storage area 667. Thus, subsequent read operations must be serviced by requesting the data from the data storage provider 591.

To ensure that the data was properly stored with the data storage provider 591, the cloud transport interface stage 565 may calculate a checksum value of data using the same type of checksum used by the data storage provider 591. After receiving data, the data storage provider 591 may transmit a checksum value back in an acknowledgement message. If the two checksum values do not match, the cloud transport interface stage 565 may retransmit the data. If checksums are used, the copy of the data in the barrier section should not be removed until matching checksums have been achieved and the settlement period has expired.

Data read requests received by the bulk storage layer 560 are handled by first determining if the data was stored by the local bulk storage system 562 in the local bulk storage area 568 or stored by the cloud transport interface 565 in the cloud storage provider 591. If the data was stored by the local bulk storage system 562, then the local bulk storage system 562 reads the data slice from the local bulk storage area 568, decompresses the data slice if necessary, and returns the data slice.

Data read requests for data stored with cloud storage provider 591 are handled by the bulk storage layer 560 in basically the same manner as writes to the cloud storage provider 591 but in reverse order. As set forth above, the bulk storage layer 560 will first attempt to serve a data request using data stored in the barrier storage area 667. If the data request cannot be served from data in the barrier storage area 667, the bulk storage layer 560 will then send a read request to the cloud data storage provider 591 using the data slice fingerprint as the name of the requested data object.

After receiving a response from the cloud data storage provider 591, the cloud transport interface stage 565 can perform data integrity check on the received data by calculating a checksum the received data. If the calculated checksum does not match the checksum received from the deduplicated storage layer 550 then the cloud data storage provider 591 may have corrupted the data. Retries may be attempted to obtain the proper data from the cloud data storage provider 591. If the proper data cannot be retrieved, a 'media error' message may be propagated up the data storage request handling stack.

When verified data has been received, that verified data is then provided to the encryption stage 563 for decryption. Next, the decrypted data is given to the compression stage 561 where the data is decompressed. After requested data has been retrieved from the cloud data storage provider 591, decrypted, and decompressed, the bulk storage layer 560 passes the requested data back up the request handling stack. In one embodiment, the system may perform a second data integrity check by recomputing the fingerprint of the decrypted/decompressed data.

The deduplicated storage layer 550 will receive the data that was fetched from the cloud and place that data back into its duplicated storage area 557 and adjust the its data structures to indicate that the data is now available in the duplicated storage area 557 of the local storage system 570. The data will remain in the duplicated storage area 557 until the deduplicated storage layer 550 again evicts the data or it is removed by the garbage collection system since it was overwritten.

Similarly, data that is read back from the local bulk storage area 568 or the cloud data storage provider 591 will continue to remain in the local bulk storage area 568 or in the cloud data storage provider 591. If the deduplicated storage layer 550 again evicts data that was already once stored in the local bulk storage area 568 or in the cloud data storage provider 591 and that data has not changed, then that data does not need to be stored in the local bulk storage area 568 or retransmitted back to the cloud data storage provider 591 since it already exists there. Thus, the deduplicated storage layer 550 can just delete its copy of the data.

Backing-Up Data Volumes Cloud Server Appliance Overview

As set forth in an earlier section and with reference to FIG. 5, the cloud storage array 500 includes a snapshot layer 532 for capturing snapshots of the current state of data volumes. The snapshot system creates a snapshot volume data structure with the state of an original volume frozen in time by referencing the original volume. When subsequent writes to the original volume are received that would destroy the state of the data referenced by the snapshot volume, the snapshot layer 532 copies the existing data in the original volume into the snapshot before the changes are made such that the snapshot volume will maintain the state of the data volume at the time the snapshot was taken. Thus, the snapshot layer 532 saves the state of a data volume at the specific instant of time when the snapshot was taken.

A snapshot volume, however, is not a back-up volume. A snapshot volume is merely a reference to an original volume with an additional set of copied data to replace sections of the existing original volume where changes that have been since the snapshot was taken. Thus, if the original volume that is referenced by a snapshot volume is destroyed then the snapshot volume will also be destroyed. (Except in the unlikely event that every single piece of data from the original volume has been changed such that the snapshot volume is now a completely new volume.) Back-up volumes need to be created in order to have a completely independent copy of a volume for archival purposes and disaster recovery. In order to construct fully independent back-ups of data volumes in the cloud storage array, a back-up system will copy data from snapshot volumes since snapshot volumes provide a static representation of a data volume at a specific instant in time.

As set forth in the earlier sections, the cloud storage array 500 will store data in at least three different locations: the linear storage area, the deduplicated storage area, and the within the bulk storage layer. The bulk storage layer may store data in a local bulk storage device and/or with a cloud data storage provider. The data in all of these locations must be backed up for a fully independent back-up volume. Since this type of cloud storage array system differs significantly from conventional storage systems wherein all the data is available locally in a simple form, a different method for performing back-ups was required.

Backing-Up Data Volumes with Cloud Clone Volumes

In the context of a cloud storage array, the back-up system of the present disclosure operates in three main phases:

1) Create a snapshot volume.
2) Create a clone of the snapshot with fingerprints of data slices.
3) Back up the finger printed data slices of the clone volume.

Figure 12:
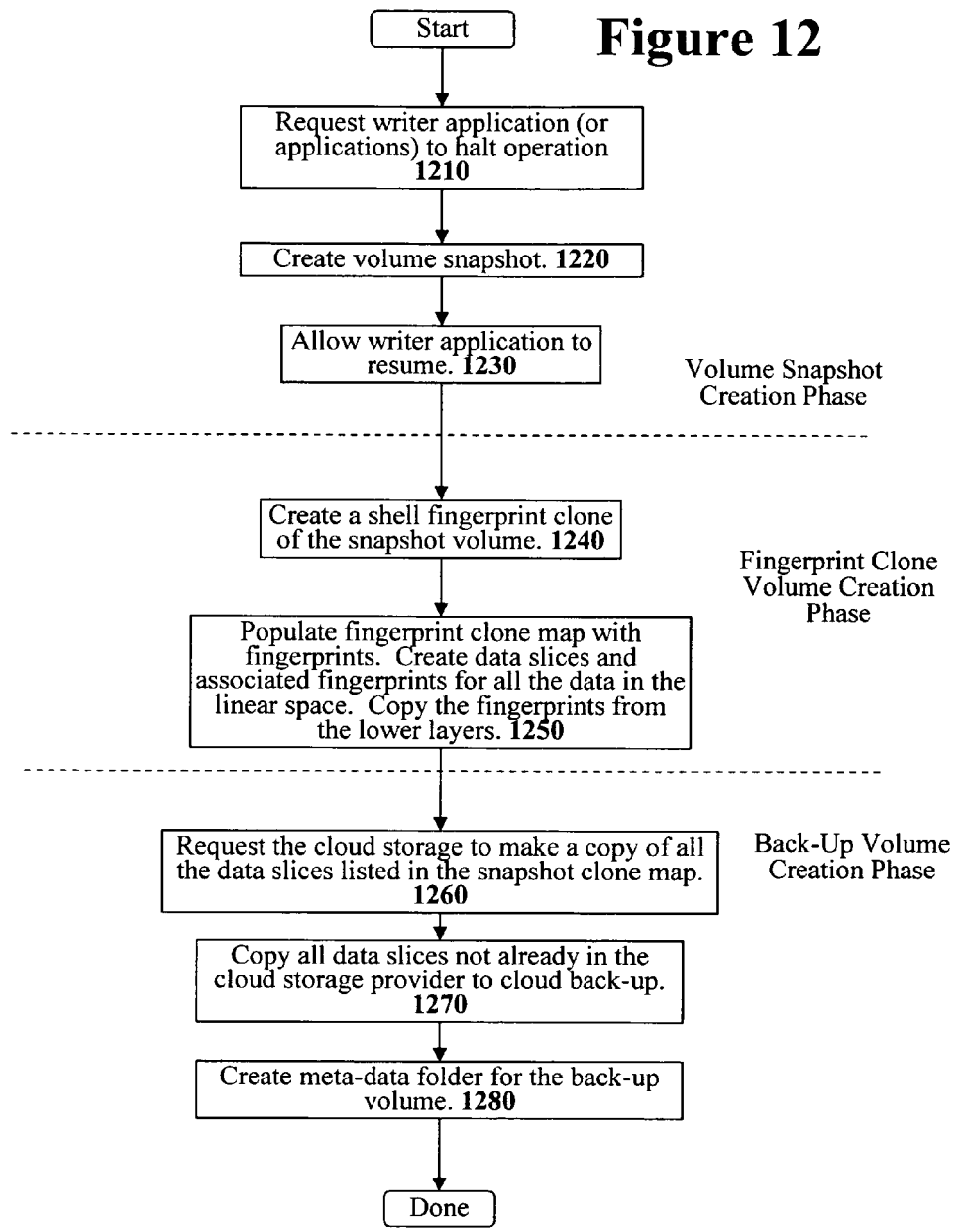
FIG. 12 illustrates a flow diagram that describes how a cloud storage array may back-up a data volume using a cloud storage provider for storage.
Figure 13:
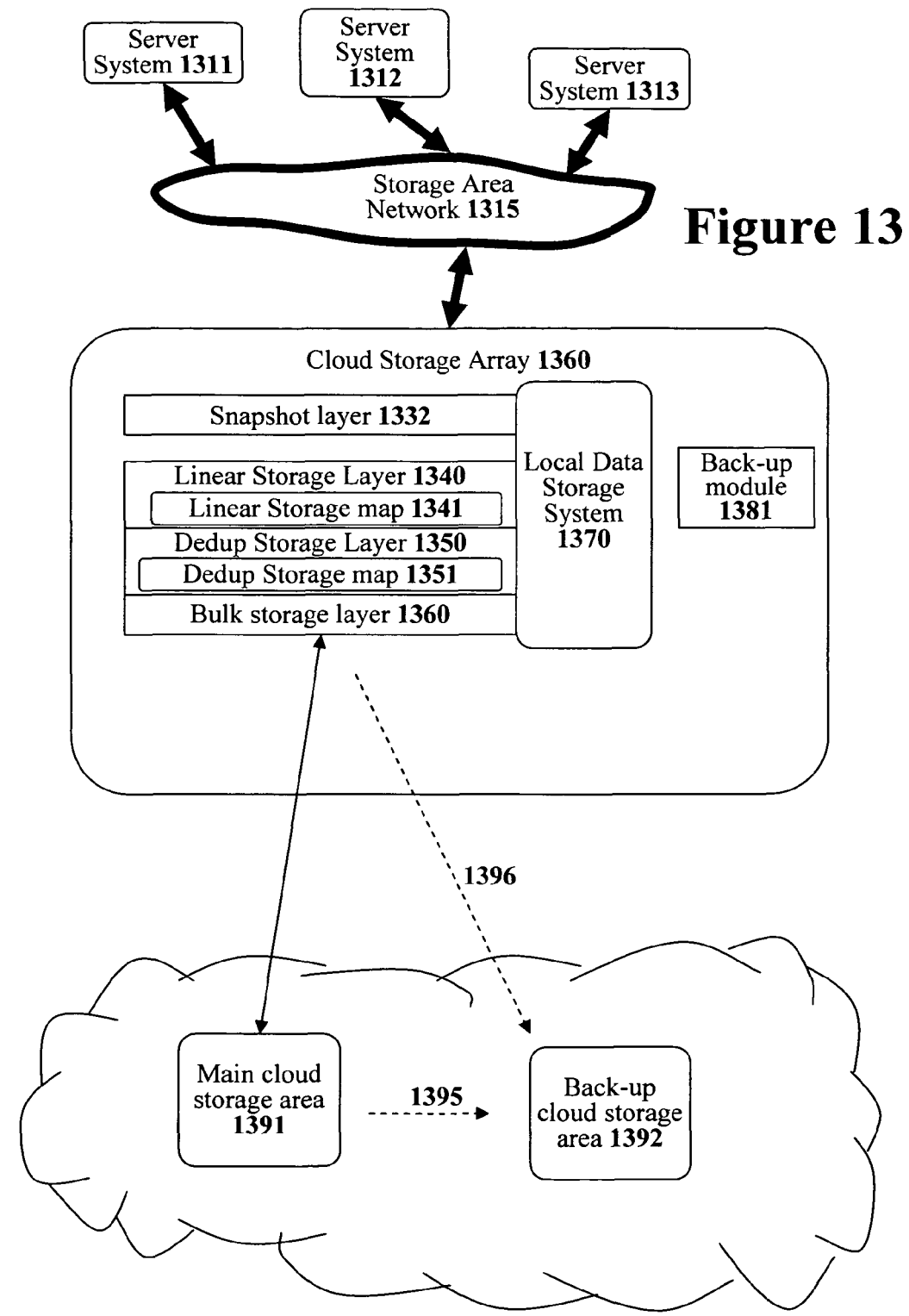
FIG. 13 illustrates a block diagram of a cloud storage array used within computer network arrangement with a back-up module that backs-up data volumes at a cloud storage provider.
Figure 14:
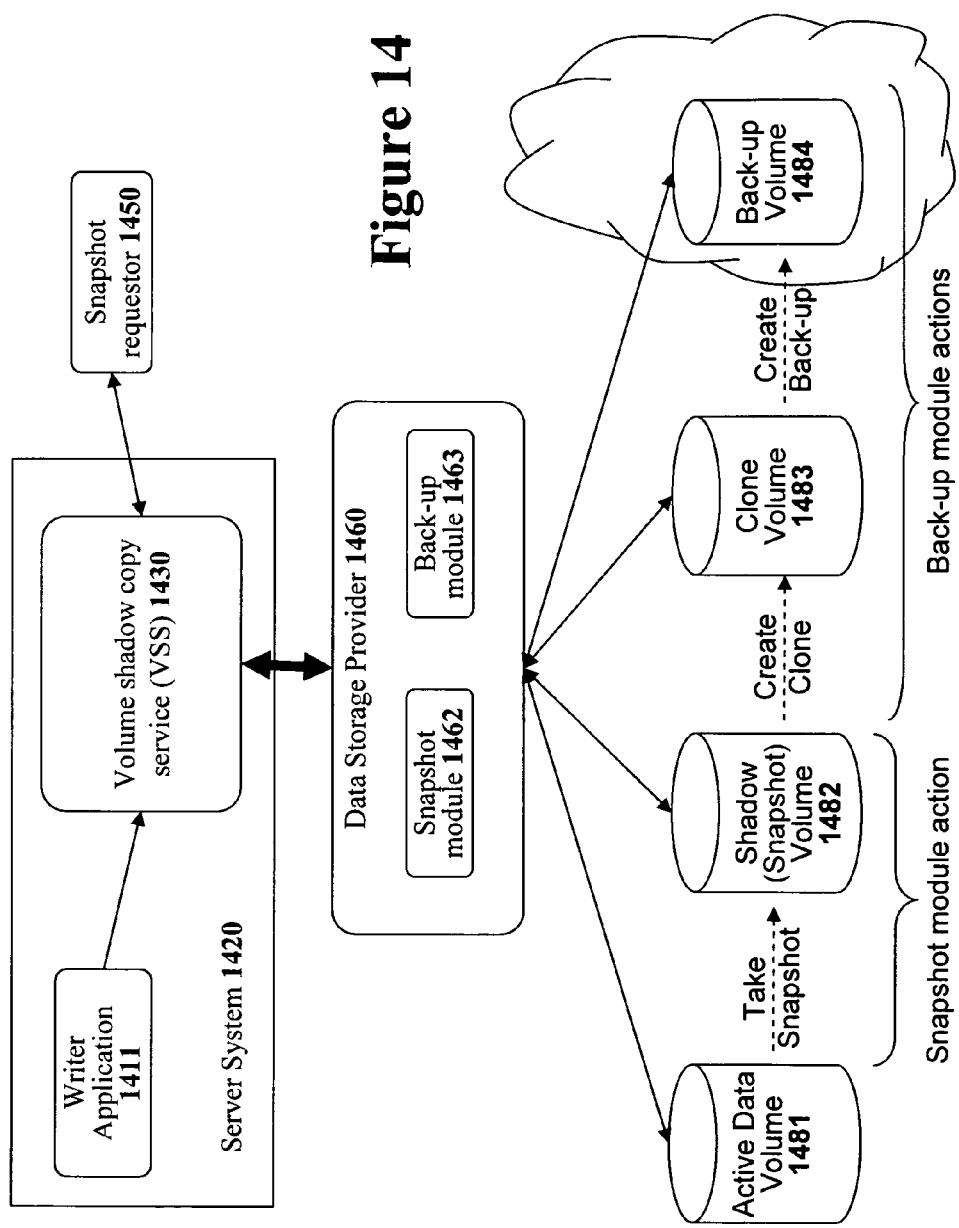
FIG. 14 illustrates a block diagram of how the Microsoft volume shadow copy service (VSS) may be used within one particular embodiment of a back-up module.
Figure 15:
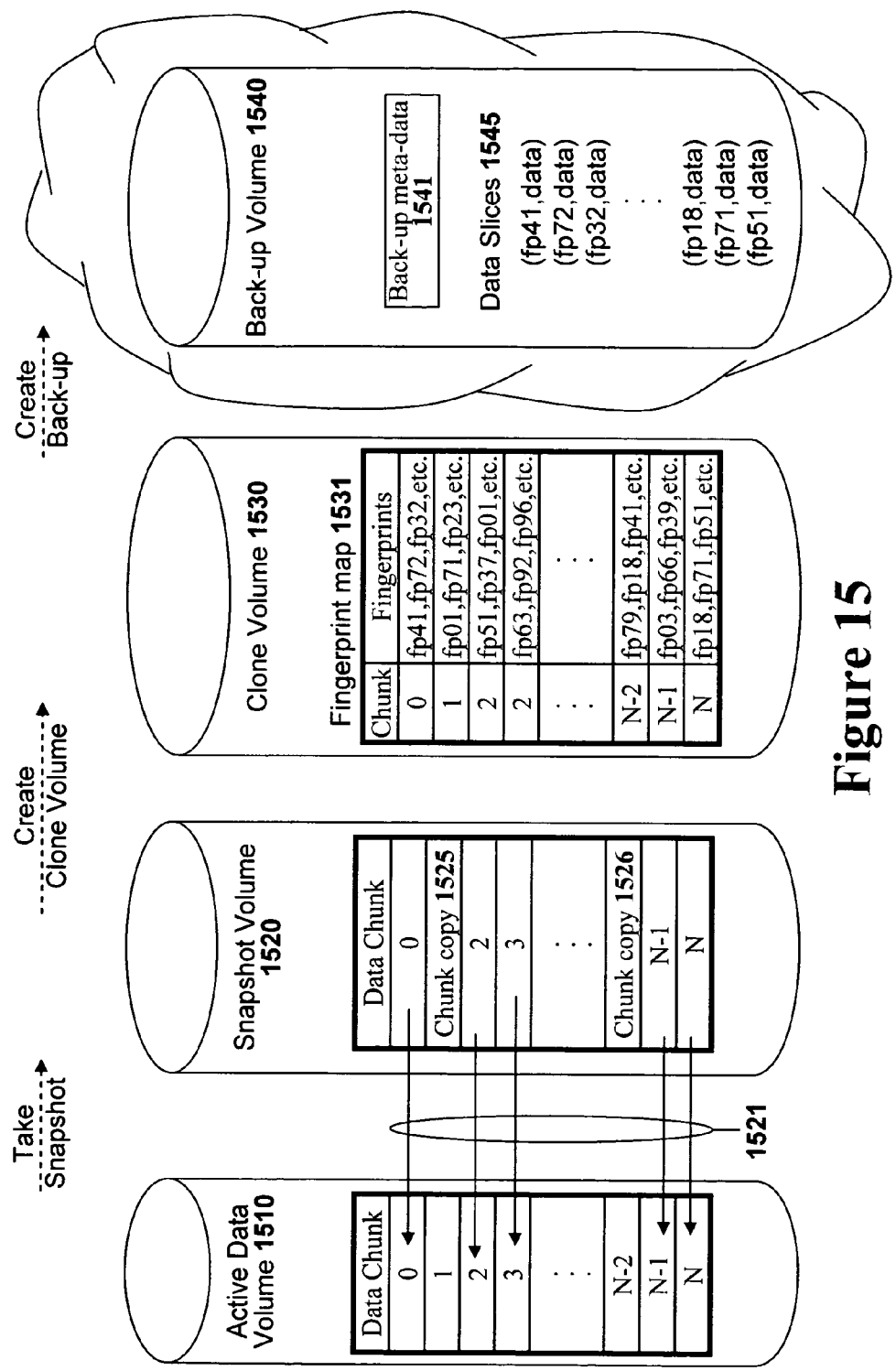
FIG. 15 conceptually illustrates an active data volume, a snapshot data volume of the active data volume, a fingerprint clone of the snapshot volume, and a back-up volume of the fingerprint clone volume.

The back-up system will be disclosed with reference to FIGS. 12, 13, 14, and 15. FIG. 12 illustrates a flow diagram that presents the entire back-up procedure in detail. The three phases listed above are illustrated in the flow diagram of FIG. 12. FIG. 13 illustrates a block diagram of an office computer arrangement that may use the disclosed back-up system. FIG. 14 illustrates a block diagram of how the Microsoft volume shadow copy service (VSS) may be used within one particular embodiment. FIG. 15 conceptually illustrates the various different versions of a data volume as a back-up volume is created.

FIG. 13 illustrates a set of server systems (1311, 1312, and 1313) that may provide services to a set of workstations on an office local area network (not shown). In the arrangement of FIG. 13, the server systems (1311, 1312, and 1313) share a storage area network (SAN) 1315 and store data on a cloud storage array system 1360. Since the data stored by cloud storage array system 1360 represents the critical information of the office, that data must be regularly backed-up and stored off-site for disaster recovery.

FIG. 12 illustrates a flow diagram describing a back-up procedure for creating back-ups of data volumes stored on the cloud storage array system 1360. The first step in creating a back-up of a data volume that is actively being used is to take a snapshot of the data volume to be backed up. The snapshot is the state of a data volume frozen at the time the snapshot is taken.

In one embodiment, the Microsoft volume shadow copy service (VSS) is used to help make data volume snapshots. The first step in creating a data volume snapshot is to request writer applications to stop writing to the target volume as set forth in stage 1210. The Microsoft volume shadow copy service (VSS) provides the ability to halt writes to a data volume such that a shadow copy (a snapshot volume) may be created. Once a shadow copy (a snapshot volume) has been created, the volume shadow copy service (VSS) allows writes to resume. Other operating systems and application programs provide similar services to allow snapshot volumes to be taken thus this document is only using the Microsoft volume shadow copy service (VSS) as an example of a such a service. For example, VMware includes a mechanism to ensure VM consistent snapshots of data volumes.

FIG. 14 illustrates a block diagram of how the volume shadow copy service (VSS) is used within computer environment. The upper left of FIG. 14 illustrates a writer application 1411 on a server system 1420 that uses storage services provided by data storage provider 1460. The writer application 1411 may be a server application programs such as mail server, database, and file server. For example, the writer application 1411 on a server system 1420 may be an application on one of the server systems (1311, 1312, and 1313) in FIG. 13. Similarly, the data storage provider 1460 may be the cloud storage array 1360. Referring back to FIG. 14, the writer application 1411 on a server system 1420 accesses an active data volume 1481 from data storage provider 1460 through the volume shadow copy service (VSS) 1430.

The volume shadow copy service (VSS) 1430 provides a service that helps the data storage provider 1460 take snapshots of data volumes used by the writer application 1411. Referring back to FIG. 12, the first stage 1210 in taking a snapshot of a target data volume is to request writer applications to stop writing to the target volume. In FIG. 14, a snapshot requestor 1450 first sends a request to the volume shadow copy service (VSS) 1430 requesting that a snapshot be taken for active data volume 1481. The volume shadow copy service (VSS) 1430 responds by first requesting the writer application 1411 that uses the target data volume to halt writing to the active data volume 1481. The snapshot requestor 1450 may be a back-up application that regularly backs up data volumes.

Referring back to FIG. 12, the second stage 1220 in taking a snapshot of a target data volume is to create the actual snapshot of the target volume. In FIG. 14, once the writer application has halted writing to the active data volume 1481, the volume shadow copy service (VSS) 1430 requests the data storage provider 1460 to create the requested shadow volume (a snapshot volume). The data storage provider 1460 invokes a snapshot module 1462 to create a snapshot volume 1482 from the active data volume 1481. The snapshot module 1462 may only have a limited time to create the snapshot volume 1482 since the writer applications need to resume their operation within predefined time boundaries.

FIG. 15 conceptually illustrates an active data volume 1510 and a snapshot data volume 1520. The active data volume 1510 is a data volume that is used by a writer application program and is therefore continually changing as writes are made to the active data volume 1510. The snapshot volume 1520 is static representation of the active data volume 1510 frozen at a specific instant in time (thus the term "snapshot"). The snapshot volume 1520 largely comprises a set of references 1521 to the original active data volume 1510 since most of the data in the active data volume 1510 will not change quickly. However, whenever new data is written to the active data volume 1510, a snapshot layer responsible for maintaining snapshot volumes will copy the old data (such as data 1525 and 1526) from the active data volume 1510 into the snapshot volume 1520 before it is overwritten such that the snapshot data volume 1520 maintains the exact state of the active data volume 1510 at the time the snapshot was taken.

Referring back to FIG. 12, the third stage 1230 in creating a snapshot of a target data volume is to allow the writer application to resume using the target data volume. Once the snapshot volume 1482 in FIG. 14 has been created, the volume shadow copy service (VSS) 1430 allows the writer application 1411 to resume writing to the active data volume 1481. At this point, the volume snapshot creation phase of FIG. 12 is complete such that there is a static snapshot volume that may be backed-up. The writer application 1411 was only temporarily inconvenienced and may now resume operations by writing to the active data volume 1481. With the static snapshot volume available, the back-up module 1463 may be invoked to create clone volume 1483 and back-up volume 1483 as will be described with reference to other figures.

The next phase in the back-up system procedure of FIG. 12 is to create a fingerprint clone volume of the snapshot volume. The fingerprint clone volume is a copy of the snapshot volume that has data fingerprints for a set of data slices that represent the entire data volume. As set forth in stage 1240, the first step is to create a shell fingerprint clone of the snapshot volume. The shell fingerprint clone is a data structure with the same number of chunks as the snapshot volume and wherein each chunk will be populated with a list of data fingerprints for data slices that represent the data of that chunk. Referring to the conceptual diagram of FIG. 15, the fingerprint clone volume 1530 contains a fingerprint map 1531 with the same number of chunks as the snapshot data volume 1530. The initial shell fingerprint map 1531 will not yet contain any fingerprints.

Referring back to FIG. 12, the next stage 1250 is to populate the shell fingerprint map in the clone volume with fingerprints. Referring to FIG. 6, the linear storage layer 640 maintains a linear storage map 641 for each data volume that defines where each data chunk of the volume is located. For data chunks that are located in the linear storage area 647 (such as data chunk 0 in FIG. 6), the linear storage map 641 contains a reference pointer to the data chunk in the linear storage area 647. For data chunks that are not located in the linear storage area 647 (such as data chunk 1), the linear storage map 641 contains an ordered list for all the fingerprints of data slices the make up the data chunk. Thus, to fill the fingerprint map in the fingerprint clone volume, the back-up system must create fingerprints for the chunks in the linear storage area 647 and copy the fingerprint data for the data chunks in the lower layers (the deduplicated storage layer and the cloud storage layer).

Referring back to FIG. 13, a back-up module 1381 in the cloud storage array 1360 may drive the creation of fingerprints for the data chunks that are in linear storage area of the local data storage 1370. In one embodiment, the back-up module 1381 requests the linear storage layer 1340 to push those data chunks down into the deduplicated storage layer 1350. The deduplicated storage layer 1350 will divide the data chunks into data slices and calculate fingerprints to each data slice. The deduplicated storage layer 1350 will then return the created fingerprints to the back-up module 1381 such that the back-up module 1381 can put those fingerprints into the clone fingerprint map. In another embodiment, the back-up module 1381 requests the snapshot layer and linear storage layer to create the clone data volume by coordinating the necessary operations between them.

As the back-up module 1381 receives data fingerprints from the various storage layers, the back-up module 1381 will note which storage layer was storing the data associated with the data finger. This origin location information will be stored as meta-data describing the back-up volume that is being created. This origin information may be used upon a restore operation to restore those the backed-up data to the exact same storage layers that had the data at the time the back-up was created. This will allow an exact replica of the data volume to be restored such that the linear storage layer will contain the "hot" data, the deduplicated layer will contain the "warm" data, and so on.

The remainder of the fingerprints (that represent for data slices that are either in the deduplicated layer 1350 or in the bulk storage layer 1360) may be copied from the linear storage map 1341 into clone fingerprint map to complete the clone fingerprint map. Again, the back-up module will note the original location (the deduplicated storage area, the local bulk storage area, or the cloud storage 1391) of the data slices associated with the data fingerprints. The original location of the data slices may be obtained from reading the deduplicated storage map 651 as illustrated in FIG. 6. This origin information will be stored as meta-data associated with the back-up volume such that the back-up system will be able to restore the data slices to the exact same locations where the data slices were located when the back-up data volume was created.

FIG. 15 conceptually illustrates a clone volume 1530 created from a snapshot volume 1520. The clone volume 1530 contains a completed fingerprint map 1531 that specifies the entire data volume in fingerprint form. Since the clone volume 1530 is deemed to be an active volume in the cloud storage array, all of the data slices associated with the fingerprints in fingerprint map 1531 of the clone volume 1530 will not be deleted from the cloud storage array. At this point, the fingerprint clone volume 1530 is complete and ready to be backed-up. Note that the fingerprint clone volume 1530 is not a fully independent back-up since it refers to the same data slices used by the snapshot volume 1520 and the original active volume 1510.

Referring back to FIG. 12, the back-up volume creation phase begins with stage 1260. To create a fully independent back-up volume from the fingerprint clone volume, the back-up module 1381 needs to create independent data back-ups of all the data slices that are referred by their fingerprints in the fingerprint clone volume. These data slices may exist either in the deduplicated storage area within the cloud storage device or at the cloud storage provider.

At stage 1260, the back-up module requests the cloud storage provider to make independent back-up copies of the data slices that are already stored with the cloud storage provider. This is graphically illustrated in FIG. 13 wherein data slices in the main cloud storage 1391 are copied along line 1395 to an independent back-up cloud storage area 1392. Most cloud storage providers provide such a copy operation that will copy data from one cloud storage repository to an independent cloud storage repository such that a fully independent back-up copy is created with a simple command. Some data storage providers may provide a special copy command to copy the data from one physical site to another physical site such that geographically remote back-ups of data are created.

The request to create back-ups of data slices already in cloud storage may be made in different manners. In one embodiment, the back-up module may go through the entire clone fingerprint map where, for each data slice, it first examines the deduplicated storage map to determine if each data slice is already in the cloud storage and if the data slice is in cloud storage then a request to copy that data slice to a back-up area is issued. In an alternate embodiment, the back-up module just requests the cloud storage provider to make a back-up copy for every fingerprint in the clone fingerprint map. For those data slices that are already in the cloud storage, this will result in overwriting the existing data with the same value.

In one embodiment, the back-up system may back-up the data slices with a different cloud storage provider. This will ensure that the data back-ups are stored at a completely different site. Note that a copy engine may need to execute to perform this copy to an independent cloud storage provider. This copy engine may execute on a different computer device (and even at a different location) to relieve the cloud storage array from having to perform this operation.

Referring back to FIG. 12, the next stage 1270 to create the back-up volume is to copy the fingerprinted data slices that were not already in the cloud storage provider to the back-up area of the cloud storage provider. Referring to FIG. 13, the back-up module 1381 may perform this in different manners. In one embodiment, the back-up module 1381 may request the deduplicated storage layer 1350 to push the remaining fingerprinted data slices down into the bulk storage layer 1360 and have the bulk storage layer 1360 store those fingerprinted data slices and the needed fingerprinted data slices from the local bulk storage area along line 1396 directly into the back-up cloud storage area 1392.

Alternatively, the back-up module 1381 may request the deduplicated storage layer 1350 to push the remaining fingerprinted data slices down to the bulk storage layer 1360 as in normal operation. The back-up module 1381 then requests the bulk storage layer 1360 to push those fingerprinted data slices and the needed fingerprinted data slices from the local bulk storage area to the main cloud storage area 1391. Once the fingerprinted data slices are in the main cloud storage area 1391, the back-up module 1381 may request the cloud storage provider to copy those fingerprinted data slices to the back-up cloud storage area 1392.

Note that stages 1260 and 1270 may be performed in reverse order. For example, in one embodiment, the back-up module 1381 first determines which fingerprinted data slices in the cloud fingerprint volume are not yet represented in the main cloud storage area 1391 and then pushes those fingerprinted data slices to the main cloud storage area 1391. Then, the back-up module 1381 can quickly back-up the entire clone volume by requesting the main cloud storage area 1391 to create a copy of all the fingerprinted data slices listed in the clone fingerprint map to the back-up cloud storage area 1392.

Referring back to FIG. 12, the final stage 1280 to create the back-up volume is to create meta-data for the back-up volume. In one embodiment, a new meta-data folder is created in the back-up cloud storage area 1392 for each back-up created. The back-up module stores all the administrative data needed to recreate the data volume in the meta-data folder.

The meta-data stored in the meta-data folder will include the fingerprint map needed to reconstruct the data volume within the cloud storage array. The meta-data will also include the location of the where each data sliced was in at the time the back-up was created. In addition to the fingerprint map, the meta-data folder may also contain other information such as access control lists (ACLs) for the backed-up data volume, timestamp information, and other information that may be used to create an identical copy of the original volume that was backed up. All of the data stored in the meta-data folder may be encrypted to ensure that any person with unauthorized access to the back-up data will not be able to understand the meta-data of the back-up volume. This meta-data may be encrypted with the same encryption keys used to create the data slices of the back-up volume.

Referring again to FIG. 15, a conceptual version of the final backed-up data volume is illustrated as a fully independent back-up volume 1540. The bulk of the independent back-up volume 1540 is made up of the individual data slices 1545 that represent all of the actual data of the backed-up data volume. Each data slice is identified by its fingerprint and contains the actual data for the data slice. Note that deduplication layer may have found many duplicate data slices such that many redundant data slices have been removed. Furthermore, each of the data slices has been compressed and encrypted such that the backed-up data volume is much smaller than the original data volume and can only be read by people with the proper decryption keys. The back-up data volume 1540 also includes the back-up meta-data 1541 that contains the all the information needed to reconstruct a normal data volume from all of the compressed and encrypted data slices 1545.

Incremental Back-Ups and Compilation Back-Ups

The disclosed back-up system can be used to efficiently make incremental back-up volumes. An incremental back-up volume is a back-up volume that references a previous back-up volume but adds data for data sections that have changed since the previous back-up volume was created.

Figure 16:
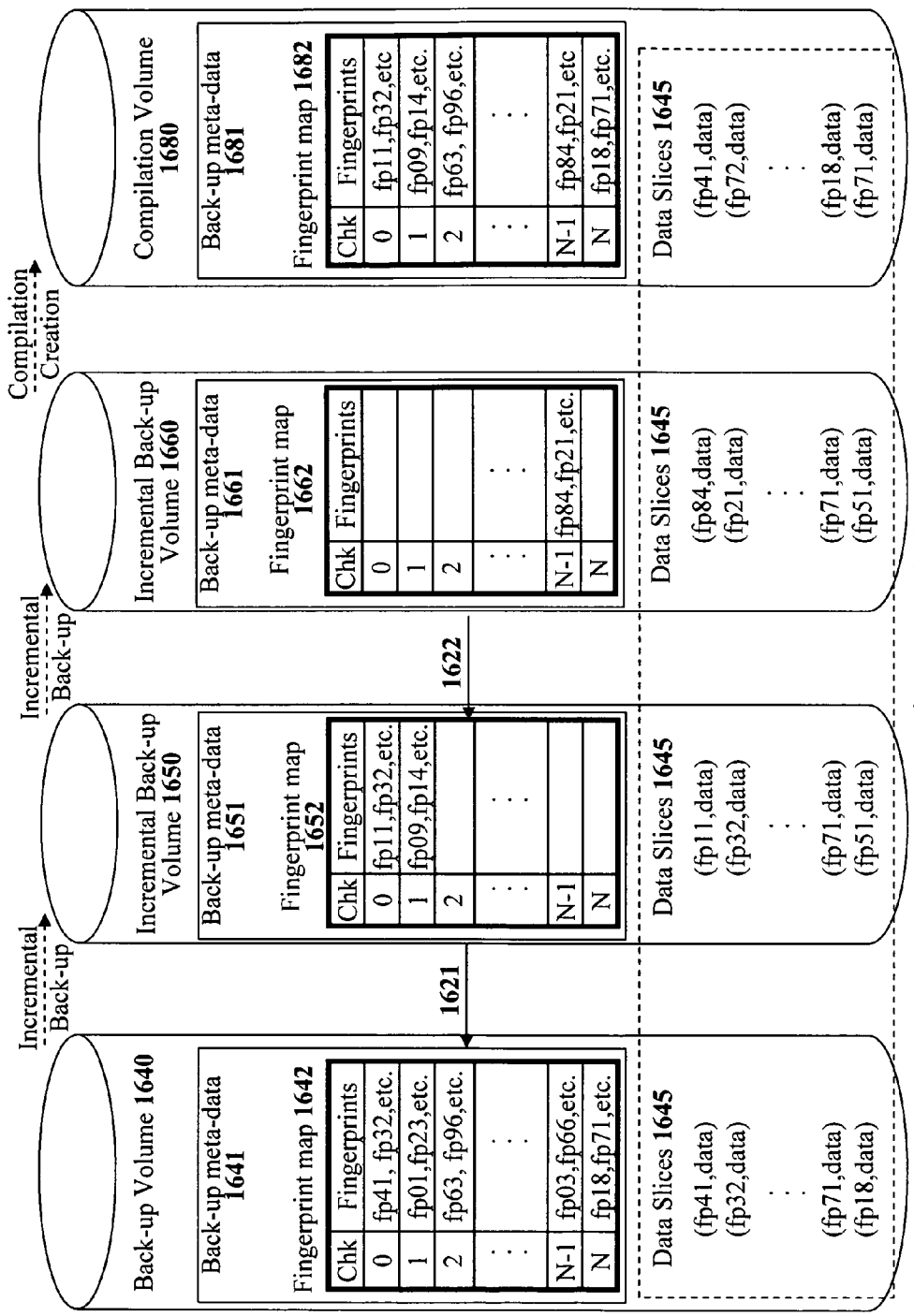
FIG. 16 conceptually illustrates how incremental and compilation back-up volumes may be represented in the system of the present disclosure.

FIG. 16 conceptually illustrates how incremental back-up volumes may be represented in the system of the present disclosure. FIG. 1640 illustrates an initial back-up volume 1640 for a particular data volume. The initial back-up volume 1640 contains the data slices 1645 that represent the actual data of the volume and the back-up meta-data 1641 that is needed to recreate the original volume from the back-up data slices 1645. Specifically, the back-up meta-data 1641 includes a fingerprint map 1642 that may be used to reconstruct the original data volume by providing the order that the data slices must be placed in.

To create incremental back-up volumes, the same initial steps may be followed to create a fingerprint map for a clone volume. The system then eliminates the entries that are the same as the previous back-up. Finally, any new data slices that were not already backed-up are copied to the back up cloud storage area.

FIG. 16 illustrates a first incremental back-up volume 1650 created for the same original data volume as the back-up volume 1640. The incremental back-up volume 1650 references the earlier back-up volume 1640 with reference pointer 1621. (The reference pointer is illustrated for conceptual understanding only. An actual implementation could use one of many different reference techniques such as related filenames, an actual pointer, file meta-data, etc.) The fingerprint map 1652 for incremental back-up volume 1650 may be largely empty except for those data chunks where the data has changed. These data chunks list a new set of fingerprints that represent the changed data chunk. The incremental back-up volume 1650 shares the same set of fingerprinted data slices 1645 as the earlier back-up volume 1640 except that a few new fingerprinted data slices (such as fingerprint 11) may have been added for the data chunks that have new data.

Successive incremental back-up volumes may reference the previous incremental back-up volume and by extension the original back-up volume. FIG. 16 illustrates a second incremental back-up volume 1660 that references the previous incremental back-up volume 1650 with reference pointer 1622 (and by extension the original back-up volume 1640). Again, the fingerprint map 1662 for the incremental back-up volume 1660 may be largely empty except for those data chunks where the data has changed. The second incremental back-up volume 1660 also shares the same set of data slices 1645 except that additional data slices may have been added for the data chunks in incremental back-up volume 1660 where the data changed.

After time, the amount of older back-up volumes may be reduced to reduce the amount of storage space used. For example, if there are daily back-ups wherein there is a new independent back-up volume created on Monday and incremental back-up volumes for Tuesday to Friday then the daily back-ups may eventually be replaced by a single compilation back-up volume for that week. The back-up volume for that week can be created by combining the base back-up with all of the incremental daily back-ups for that week.

FIG. 16 illustrates an example of a compilation back-up volume 1680 that has been create by combining the original back-up volume 1640 along with incremental back-up volumes 1650 and 1660. Once a compilation back-up volume 1680 has been created the back-up meta data 1641, 1651, and 1661 associated with previous back-up volumes 1640, 1650, and 1660, respectively, may be deleted. However, the fingerprinted data slices 1645 are not deleted except that the fingerprinted data slices that are not referenced by the compilation back-up volume 1680 may be deleted.

Restoring a Backed-Up Data Volume

Once a data volume has been fully backed-up into the back-up cloud storage area 1392, that back-up data volume can easily be restored. A backed-up data volume may be restored for many different reasons. For example, a data volume may be restored to access some data that was accidentally deleted, a data volume may be restored due to a hardware failure, or a company may wish to perform data mining on data stored in archived data volumes.

To restore a backed-up data volume, an administrative console would first read the back-up cloud storage area 1392 to identify all of the backed-up data volumes that are available for restoration. The administrator of the cloud storage array would then select a backed-up data volume to restore.

In one embodiment, the administrative program for back-up operations includes several "plug-in" modules for restoring specific data for various different application programs. For example, the back-up administrative program may include a plug-in module associated with an email server application for restoring a particular user's mailbox that has been deleted. The back-up administrative program would restore the needed data volume and then invoke code in the plug-in module (or in the email server application) for extracting the requested subset of data (such as a user mailbox) from the restored data volume. The back-up administrative program may then remove the restored data volume if it is no longer needed after the plug-in module has completed its operation.

After selecting some data to restore or a full data volume to restore, the back-up module 1381 would then execute a restore procedure. In one embodiment, there are two different types of restore operations: a quick 'virtual' restore operation and a full exact replica restore operation. Both restore operations will be disclosed with reference to the flow diagram of FIG. 17.

Both the quick 'virtual' restore and the full exact replica restore begin in the same manner. First, the information from the meta-data folder is read at stage 1710 so the back-up module has all the information needed to perform the restore operation. The most important piece of information is the fingerprint map needed to reconstruct the backed-up data volume.

Next, at stage 1720, all of the fingerprinted data slices for the backed-up volume are copied from back-up cloud storage area 1392 into the main cloud storage area 1391 using the fingerprint map. (Note that many of the fingerprinted data slices may already exist within main cloud storage area 1391 such that those fingerprinted data slices do not need to be copied.)

At stage 1730, the deduplicated storage layer in the cloud storage array may be informed about the new data slices restored into the main cloud storage area 1391. Referring to FIG. 6, the deduplicated storage layer 650 will create new entries in the deduplicated storage map 651 for all the new data slices copied back into the main storage area of data storage provider 691. The newly created entries in the deduplicated storage map 651 will contain the fingerprint and mark the location of the data slice as being stored in the cloud. (If the exact same data slice already existed in the deduplicated storage map 651 then no change needs to be made.) At this point all of the raw data for the backed-up volume is now available to the cloud storage array but the data cannot yet be accessed since no formal volume has been created on the cloud storage array.

In an alternative embodiment, the deduplicated storage layer 650 is not informed about all of the data slices that have been restored into the main cloud storage area 1391. Instead, the deduplicated storage layer 650 will assume that any data slice request for a fingerprinted data slice that is not represented in the deduplicated storage map 651 must in the main storage area of cloud storage provider 691. Thus, the deduplicated storage layer 650, when asked for data associated with a fingerprint it doesn't have, will request the missing fingerprinted data slice from the cloud storage provider 691 and add that data slice into the deduplicated storage map 651 upon receipt. In this manner, the work that must be performed to restore a volume is reduced.

Referring back to FIG. 17, the restoration enters a restored volume creation phase. At stage 1740, the back-up module creates a restored data volume in the cloud storage array. The restored data volume is created by creating a new data volume entry in the linear storage layer using the fingerprint map of the backed-up volume. The new volume entry in the linear storage layer will contain an entry for every data chunk of the restored volume. Each data chunk entry will contain a list of the fingerprints for that chunk.

At the next stage 1750, the two different restore operations diverge. If the restore operation is a quick restore operation then back-up system can proceed to step 1780 and expose the restored data volume to users of the cloud storage array. All of the data slices for the restored data volume that were copied from the back-up area of cloud storage will now exist in the main cloud storage area such that most initial access operations to the restored data volume will have some latency. However, this is acceptable if the data volume was being restored just to obtain a small amount of data such as restoring a single mailbox associated with a mail server or a single file of an entire partition.

If the restore operation is a full exact replica restore operation then the back-up system proceeds to stage 1760 where the back-up system copies each data slice from the main cloud storage area to its original location when the back-up volume was created using data origin information stored in the meta-data folder. Thus data slices from chunks that were originally in the linear storage layer will be restored to the linear storage area as a reconstructed chunk. The data slices that were in the deduplicated storage area when the back-up was created will be copied into the deduplicated storage area. The data slices that were cloud storage when the back-up volume was created will remain in the main cloud storage area.

At stage 1770, the system updates the linear storage map and the deduplicated storage map to identify the restored locations of the data chunks and data slices, respectively. Then at stage 1780, the fully restored data volume is exposed such that it may be accessed by users of the cloud storage array. A data volume that is fully restored will have the same performance characteristics as it had when it was originally backed up. Thus, the "hot" data will be available in the linear storage layer, the "warm" data will be in the deduplicated storage layer, and the "cold" data will remain in the cloud storage.

Backing-Up Data Volumes in a Traditional Storage System

The techniques used to create back-up of a cloud storage array volume can be adapted to work with traditional storage system data volumes. The deduplication, compression, and encryption techniques provide advantages when used to create cloud storage based back-ups of data volumes in traditional storage systems.

Like the cloud array storage back-up system, the back-up system for traditional storage systems also operates in three main phases: (1) Creation a snapshot volume; (2) Creation of a clone of the snapshot volume with fingerprints of data slices; and (3) Backing up the fingerprinted data slices. These three phases are disclosed in the flow diagram of FIG. 18 that describes how the back-up teachings of the present disclosure may be adapted for use with traditional storage systems.

The initial snapshot volume creation phase for traditional storage back-up system is the same as for the cloud storage array back-up system. The first step in creating a snapshot of a data volume is to request writer applications to stop writing to the target volume as set forth in stage 1811. The same Microsoft volume shadow copy service (VSS) may be used to halt writes to a data volume such that a shadow copy (a snapshot volume) may be created as illustrated in FIG. 14. The second stage 1812 in taking a snapshot of a target data volume is to create the actual snapshot of the target data volume. Traditional storage systems have systems for creating snapshot volumes. The writer applications are then allowed to resume writing to the active data volume at stage 1813.

After creating the snapshot volume, the back-up system enters a clone volume creation phase. The clone volume creation phase is more complicated for traditional storage systems than for the cloud array storage system since the data slicing infrastructure does not exist in traditional storage systems.

The first step in creating a fingerprint clone volume is to divide the snapshot volume into data chunks at stage 1820. These data chunks may be the same 256K sized chunks as used in the cloud storage array back-up system or any other size. However, it is desirable to make the data chunks some multiple of the logical disk block size (typically 512 bytes). After dividing the snapshot volume into data chunks, the back-up system creates a shell (empty) fingerprint clone volume map at stage 1830. The fingerprint clone volume map is a data structure with a same number of data chunk entries that the snapshot volume has. Each data chunk entry in the fingerprint clone volume map will store an ordered list of data slices that make up that data chunk.

The back-up system then proceeds to fill the fingerprint clone volume with data slice fingerprints. The back-up system starts with a first chunk and divides that chunk into data slices at stage 1831. The back-up system may use the same Rabin fingerprint system disclosed with reference to FIG. 10 to divide each data chunk into data slices. The Rabin fingerprint calculator window 1050 may sweep through data chunk 1010 progressively calculating Rabin fingerprint values. The Rabin fingerprint values may then be used to periodically drop anchors to define data slices.

Referring back to FIG. 18, the back-up system then processes all the data slices for the divided data chunk. A unique identifier fingerprint is calculated for a data slice at stage 1840. The unique identifier fingerprint is a statistically unique identifier such as a SHA-256 data fingerprint. The unique identifier fingerprint is placed into the fingerprint clone volume map at stage 1841.

At stage 1845, the back-up system determines if this is a new unique fingerprint that was not already encountered while creating this back-up volume and that is not already stored at the off-site cloud back-up storage area. To perform this test, the back-up system should have a list of all the data fingerprints of data slices that already exist in the cloud back-up storage area. If this is a new unique data fingerprint (one that does not exist in the clone volume fingerprint map currently being created nor at cloud back-up storage area) then the back-up system proceeds to create a compressed and encrypted version of the data slice at stage 1847. The same techniques disclosed in previous sections for creating compressed and encrypted data slices may be used here.

After the data slice creation (or if the data fingerprint was not unique), the back-up system tests if this is the last data slice for the current data chunk at stage 1850. If this is not the last data slice then the back-up system proceeds back to stage 1840 to process the next data slice in the data chunk. If it was the last data slice for the data chunk then the back-up system tests to see if this is the last data chunk for the snapshot volume at stage 1860. If this is not the last data chunk then the back-up system proceeds back to stage 1831 to process the next data chunk in the snapshot data volume.

After processing all of the data chunks of the snapshot volume, the back-up system then enters the actual back-up volume creation phase. The back-up system first copies all of the new unique fingerprinted data slices that were identified to the cloud back-up storage area at stage 1870. This ensures that the cloud back-up storage area will now have independent copies of all of the data slices needed to fully recreate the backed-up volume. Then the back-up system creates a meta-data folder for the newly backed-up volume in the cloud back-up storage area. The back-up system will copy the clone volume fingerprint map into the meta-data folder along with any other information needed to recreate the backed-up volume. Note that these techniques may be used to create back-ups on other media formats such as magnetic tapes and optical disks.

The cloud storage based back-up system for traditional back-up storage systems will generally not be as efficient as the back-up system for cloud storage array since the system does not already have data slices stored at the cloud storage system nor data slices that have already be created within the deduplicated storage area. However, the system does remove redundant information within the data volume being backed up by identifying identical data slices. Furthermore, after an initial back-up, later back-ups may need to send less data since many of the fingerprinted data slices may already be stored in the cloud back-up storage area from previous back-up operations.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim is still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:
1. A method of backing-up an active data volume in a multi-tiered data storage system, said method comprising:
   storing data in said active data volume of said multi-tiered data storage system by storing data in a first data tier comprising a first set of data chunks, said first set of data chunks stored in a first tier memory system, storing data in a second data tier comprising a set of second tier data slices stored in a second tier memory system, said second tier data slices may be combined to create data chunks in a second set of data chunks, storing data in a third data tier comprising a set of third tier data slices, said third tier data slices stored in bulk storage, said third tier data slices may be combined with said second tier data slices to create data chunks in a third set of data chunks;

creating a snapshot volume of said active data volume;

creating a fingerprint data map of said snapshot volume, said fingerprint data map comprising an ordered list of data slice fingerprints, each of said data slice fingerprints comprising a statistically unique fingerprint of an associated data slice in said snapshot volume;

copying unique data slices of said associated data slices to a back-up storage system; and storing said fingerprint data map in said back-up storage system.

2. The method of backing-up an active data volume as set forth in claim 1 wherein said back-up storage system comprises a back-up area at a cloud data storage provider.

3. The method of backing-up an active data volume as set forth in claim 2 wherein a subset of said unique data slices are already stored with said a cloud data storage provider.

4. The method of backing-up an active data volume as set forth in claim 1 wherein said snapshot volume comprises an ordered set of fixed length data chunks and each of said fixed length data chunks comprises a set of ordered set of said associated data slices.

5. The method of backing-up an active data volume as set forth in claim 1 wherein a subset of said data slice fingerprints and said associated data slices already exist in said back-up storage system.

6. The method of backing-up an active data volume as set forth in claim 1 wherein copying said unique data slices to said back-up storage system comprises:
    copying said unique data slices to a main storage area of a cloud data storage provider; and
    requesting said cloud data storage provider to back-up said unique data slices.

7. The method of backing-up an active data volume as set forth in claim 1, said method further comprising:
    storing a data tier identifier for each of said associated data slices in said back-up storage system, said data tier identifier identifying which of said multiple data tiers said associated data slice was residing in.

8. The method of backing-up an active data volume as set forth in claim 1 wherein creating said fingerprint data map of said snapshot volume comprises:
    dividing a first set of data chunks into a first set of data slices, creating a first set of data slice fingerprints for said first set of data slices, and placing said first set of fingerprints in said fingerprint data map; and
    copying a second set of existing data slice fingerprints for a second set of existing data slices from a second set of data chunks in said snapshot volume.

9. A method of backing-up an active data volume in a data storage system as claimed in claim 1, said method further comprising:
    dividing said snapshot volume into said associated data slices.

10. The method of backing-up an active data volume as set forth in claim 1 wherein said associated data slices comprise variable length data slices.

11. A data storage system for storing digital data, said data storage system dividing data volumes into data chunks and said data storage system comprises a tiered data system with data stored in multiple data tiers, said data storage comprising:
    a tiered data system, said tiered data system comprising
        a first data tier comprising a first set of data chunks, said first set of data chunks stored in a first tier memory system,
        a second data tier comprising a set of second tier data slices stored in a second tier memory system, said second tier data slices may be combined to create data chunks in a second set of data chunks, and
        a third data tier comprising a set of third tier data slices, said third tier data slices stored in bulk storage, said third tier data slices may be combined with said second tier data slices to create data chunks in a third set of data chunks;
    an active data volume on said tiered data system;
    a snapshot system for creating a snapshot volume of said active data volume;
    a clone volume creation system, said clone volume creation system for creating a fingerprint data map of said snapshot volume, said fingerprint data map comprising an ordered list of data slice fingerprints, each of said data slice fingerprints comprising a statistically unique fingerprint of an associated data slice in said snapshot volume; and
    a back-up system, said back-up system copying unique data slices of said associated data slices to a back-up storage system and storing said fingerprint data map in said back-up storage system.

12. The data storage system as set forth in claim 11 wherein said back-up storage system comprises a back-up area at a cloud data storage provider.

13. The data storage system as set forth in claim 12 wherein a subset of said unique data slices are already stored with said a cloud data storage provider.

14. The data storage system as set forth in claim 11 wherein said snapshot volume comprises an ordered set of fixed length data chunks and each of said fixed length data chunks comprises a set of ordered set of said associated data slices.

15. The data storage system as set forth in claim 11 wherein a subset of said data slice fingerprints and said associated data slices already exist in said back-up storage system.

16. The data storage system as set forth in claim 11 wherein said back-up system copies said unique data slices to a main storage area of a cloud data storage provider and requesting said cloud data storage provider to back-up said unique data slices.

17. The data storage system as set forth in claim 11 wherein said back-up system stores a data tier identifier for each of said associated data slices in said back-up storage system, said data tier identifier identifying which of said multiple data tiers said associated data slice was residing in.

18. A data storage system as claimed in claim 11, said data storage system further comprising:
    a data volume divider, said data volume divider dividing said snapshot volume into said associated data slices.

19. The data storage system as set forth in claim 11 wherein said associated data slices comprise variable length data slices.

* * * * *